United States Patent
Gerhard et al.

(10) Patent No.: US 8,132,987 B2
(45) Date of Patent: Mar. 13, 2012

(54) METHOD FOR REMEDIATING CONTAMINATED LAND

(75) Inventors: Jason Gerhard, Ontario (CA); Jose Torero, Edinburgh (GB); Paolo Pironi, Edinburgh (GB); Christine Switzer, Edinburgh (GB); Guillermo Rein, Edinburgh (GB)

(73) Assignee: University Court of the University of Edinburgh (GB)

( * ) Notice: Subject to any disclaimer, the term of this patent is extended or adjusted under 35 U.S.C. 154(b) by 636 days.

(21) Appl. No.: 12/086,323

(22) PCT Filed: Dec. 8, 2006

(86) PCT No.: PCT/GB2006/004591
§ 371 (c)(1),
(2), (4) Date: Dec. 19, 2008

(87) PCT Pub. No.: WO2007/066125
PCT Pub. Date: Jun. 14, 2007

(65) Prior Publication Data
US 2009/0180836 A1  Jul. 16, 2009

(30) Foreign Application Priority Data

Dec. 10, 2005  (GB) .................................. 0525193.9

(51) Int. Cl.
*B09C 1/06* (2006.01)
(52) U.S. Cl. .................................. 405/128.85; 588/320
(58) Field of Classification Search ............. 405/128.85; 588/320
See application file for complete search history.

(56) References Cited

U.S. PATENT DOCUMENTS

| 4,748,921 A | 6/1988 | Mendenhall |
| 5,482,402 A * | 1/1996 | Nelson .................... 405/128.65 |
| 5,813,799 A * | 9/1998 | Calcote et al. ........... 405/128.25 |
| 6,540,018 B1 | 4/2003 | Vinegar et al. |
| 6,702,032 B1 * | 3/2004 | Torras, Sr. ....................... 169/48 |
| 2004/0120772 A1 | 6/2004 | Vinegar et al. |

FOREIGN PATENT DOCUMENTS

| DE | 1176782 B | 8/1964 |
| DE | 20 20 612 A1 | 12/1971 |
| DE | 2020612 A1 | 12/1971 |
| DE | 2317441 A1 | 10/1974 |
| DE | 3619494 A1 | 12/1987 |
| DE | 4011206 A1 | 10/1991 |
| JP | 09206732 A2 | 8/1997 |

(Continued)

OTHER PUBLICATIONS

Translation of DE 2020612—undated.*

(Continued)

*Primary Examiner* — John Kreck
(74) *Attorney, Agent, or Firm* — Drinker, Biddle & Reath, LLP

(57) ABSTRACT

A method for remediating land contaminated by a combustible material, in particular, land contaminated with non-aqueous phase liquids (NAPLs), which includes the steps of locating a subterranean volume of combustible material such as a DNAPL in land to be remediated, and igniting the combustible material to combust the material and thereby remediate the land. By monitoring combustion of the material, combustion may be optimised by, for example, supplying an oxidant or a combustion suppressant.

18 Claims, 11 Drawing Sheets

FOREIGN PATENT DOCUMENTS

| JP | 201141219 A2 | 5/2001 |
|---|---|---|
| JP | 2002186954 A2 | 7/2002 |
| WO | WO 00/75568 A | 12/2000 |

OTHER PUBLICATIONS

Torero, J. L., et al., "Opposed Forced Flow Smoldering of Polyurethane Foam", Combustion Science and Technology, vol. 91, pp. 95-117, (1993).

Zhou, X., et al., "On the Propagation of a Reaction Front Through a Porous Fuel in the Presence of an Opposed Forced Flow: Application to Mixtures Characteristic of Municipal Waste", Combustion Science and Technology, vols. 110 111, pp. 123-146, (1995).

Torero, J. L., et al., "Natural Convection Smolder of Polyurethane Foam, Upward Propagation", Fire Safety Journal 24, pp. 35-52, (1995).

Torero, J. L., et al., "Forward Smolder of Polyurethane Foam in a Forced Air Flow", Combustion and Flame 106: pp. 89-109 (1996).

Anderson, M. K., et al., "Downward smolder of polyurethane foam: ignition signatures" Fire Safety Journal 35, pp. 131-147, (2000).

Wu, N., et al., "The Effect of Weathering on the Flammability of a Slick of Crude Oil on a Water Bed", Combustion Science and Technology, vol. 161, pp. 269-308, (2000).

Cordova, J. L., et al., "Oxidizer Flow Effects on the Flammability of Solid Combustibles", Combustion Science and Technology, vol. 164, pp. 253-278, (2001).

Rogaume, T., et al., "The effects of different airflows on the formation of pollutants during waste incineration", Fuel 81, pp. 2277-2288, (2002).

Torero, J. L., et al., "Determination of the Burning Characteristics of a Slick of Oil on Water", Spill Science & Technology Bulletin, vol. 8, No. 4, pp. 379-390, (2003).

Rogaume, T., et al., "Computational Model to Investigate the Mechanisms of $No_x$ Formation During Waste Incineration", Combustion Science and Technology, vol. 176, n°5-6, pp. 925-943, (2004).

Ma, T., et al., "Burning Rate of Liquid Fuel on Carpet (Porous Media)", Fire Technology, 40, pp. 227-246, (2004).

Vantelon, J.P., et al., "Experimental observations on the thermal degradation of a porous bed of tires", Proceedings of the Combustion Institute 30, pp. 2239-2246, (2005).

Geosyntec Consultants, "Assessing the Feasibility of DNAPL Source Zone Remediation: Review of Case Studies", GeoSyntec Project No. TRO132, Apr. 2004.

Expert Panel on DNAPL Remediation, Kavanaugh, M. C., et al., "The DNAPL Remediation Challenge: Is There a Case for Source Depletion?", EPA/600/R-03/143, Dec. 2003.

Baker, R. S., et al., "A Description of the Mechanisms of In-Situ Thermal Destruction (STD) Reactions", ORTs-2, Toronto, Canada, Nov. 17-21, 2002.

Howell, J. R., et al., "Combustion of Hydrocarbon Fuels Within Porous Inert Media", Prog. Energy Combust. Sci. vol. 22, pp. 121-145, (1996).

Vantelon, J. P., et al., "Experimental observations on the thermal degradation of a porous bed of tires", Proceedings of the Combustion Institute 30, pp. 2239-2246, (2005).

Merzhanov A. G., et al., "Theory of Combustion Waves in Homogeneous Media", Prog. Energy Combust Sci., vol. 14, pp. 1-98, (1998).

Aldushin, A. P., et al., "Maximal Energy Accumulation in a Superadiabatic Filtration Combustion Wave", Combustion and Flame 118: pp. 76-90 (1999).

Desoete, G., "Stability and Propagation of Combustion Waves in Inert Porous Media".

Ohlemiller, T. J., "Smoldering Combustion", SFPE Handbook of Fire Protection Engineering, $3^{rd}$ Edition, pp. 2/200-210, (2002).

Greaves, M., et al., "Air Injection into Light and Medium Heavy Oil Reservoirs: Combustion Tube Studies on West of Shetlands Clair Oil and Light Australian Oil", Trans IChemE, vol. 78, Part A, Jul. 2000.

Kok, M. V., "Performance Prediction of In Situ Combustion Processes", Energy Sources, 23: pp. 937-943, (2001).

Akin, S., et.al., "Experimental and Numerical Analysis of Dry Forward Combustion with Diverse Well Configuration", Energy & Fuels, 16, pp. 892-903, (2002).

Showalter, W. E., "Combustion-Drive Tests", Society of Petroleum Engineers Journal, Mar. 1963.

Kazi, R. A., et al., "High-Pressure Flow Reactor: Design and Application to Pertinent Oil Recovery Studies", Energy & Fuels an American Chemical Society Journal, vol. 14, No. 3, May/Jun. 2000.

Notification of Reasons for Refusal for JP Patent Application 2008-543904.

Babrauskas, V., "Ignition Handbook," Fire Science Publishers & Society of Fire Protection Engineers, 2003.

Drysdale, D., An Introduction to Fire Dynamics. Second Edition. John Wiley and Sons, New York, 1999.

Tse, S. D. And Fernandez-Pello, A. C. "Some Observations of Two-Dimensional Smoldering and the Transition to Flaming," Transport Phenomena in Combustion.

J. T'ien, H-Y. Shih, C-B. Jiang, H.D. Ross, F.J. Miller, A.C. Fernandez-Pello, J.L. Torero and D. C. Walther, Mechanisms of Flame Spread and Smolder Wave . . . .

\* cited by examiner

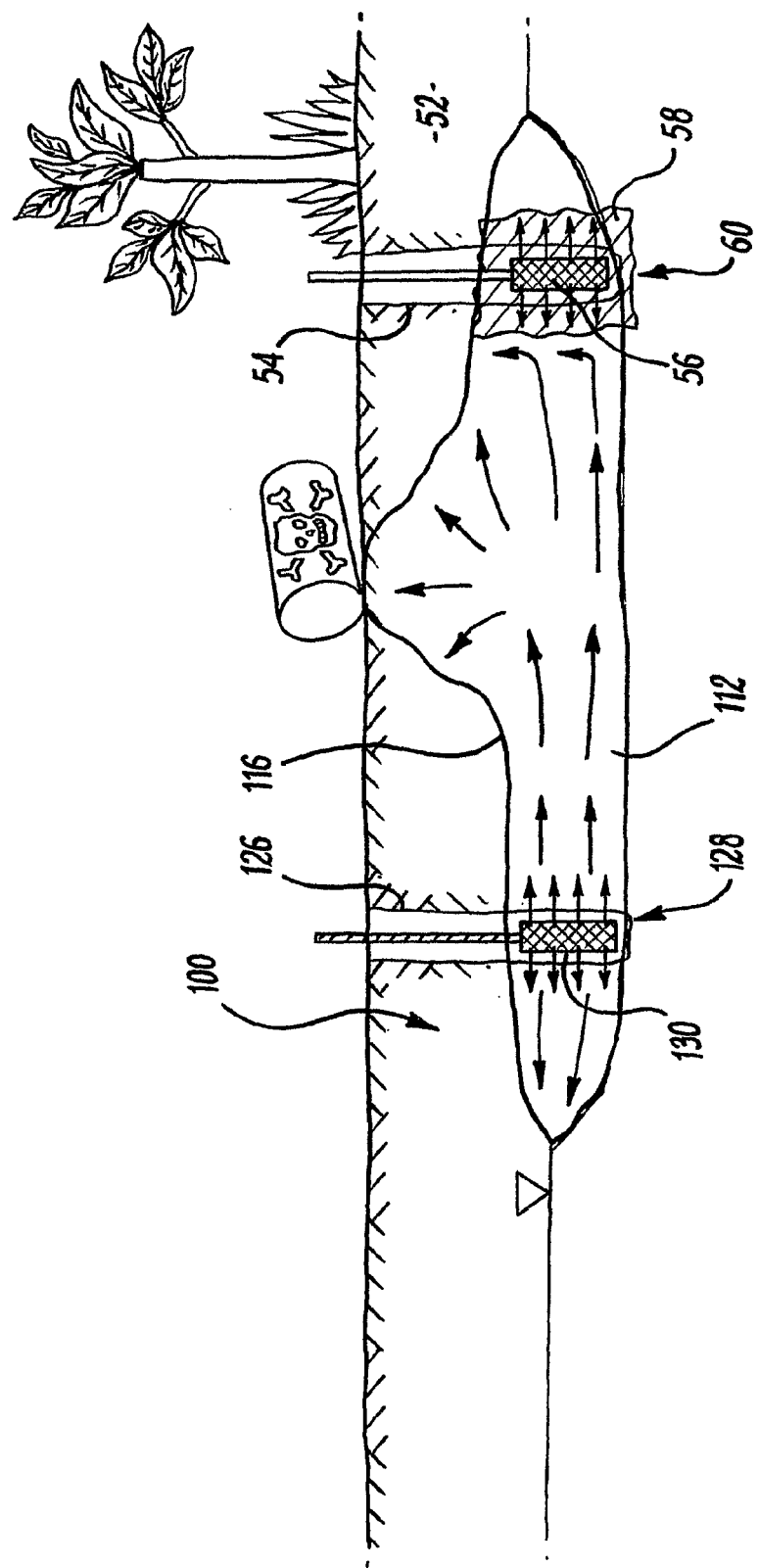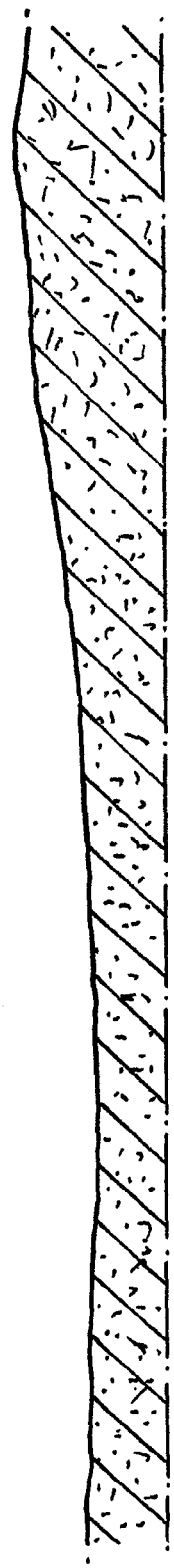
Fig. 6

| Category | Soil type | Contaminant | Successful In Situ Combustion? (yes/no) | Ignition Temp (°C) | Maximum Temp (°C) | Time to Ignition (including preheating) (min) | Combustion Propagation Velocity (m/s) | Completely Remediated (Visual Inspection)? (yes/no)[1] | Completely Remediated (GC Analysis)? (yes/trace/NA)[2] |
|---|---|---|---|---|---|---|---|---|---|
| Base Case | Coarse sand | Coal tar | Yes | 400 | 1032 | 57 | 4.1×10⁻⁵ | Yes | Trace |
| Vary Contaminant | Coarse sand | Vegetable oil | Yes | 203 | 786 | 44 | - | Yes | Yes |
| | Coarse sand | Solid Explosive | Yes | 192 | 370 | 58 | - | Yes | NA |
| | Coarse sand | DCA/grease | Yes | 200 | 688 | 22 | - | Yes | Trace |
| | Coarse sand | TCE/oil | Yes | 350 | 689 | 24 | - | Yes | Trace |
| | Coarse sand | Dodecane/oil | Yes | 240 | 660 | 32 | - | Yes | Trace |
| Vary Porous Media | Fine sand | Coal tar | Yes | 400 | 822 | 23 | 1.4×10⁻⁵ | No | Trace |
| Heterogeneity | 2 layers: coarse over fine sand | Coal tar | Yes | 425 | 1139 | 43 | 8.3×10⁻⁵ | Yes | Yes |
| | 2 contaminated coarse sand layers separated by a clean fine sand layer | Coal tar | yes | 400 | 1139 | 47 | 8.3×10⁻⁵ | Yes | NA |
| Vary Fluid Saturations | 40% water-saturated coarse sand | Coal tar | Yes | 470 | 1040 | 47 | 7.4×10⁻⁵ | Yes | Trace |
| | Coarse sand | 30% Coal tar saturation | Yes | 400 | 715 | 48 | 4.4×10⁻⁵ | No | Yes |
| Field Samples | Peat | Field coal tar | Yes | 300 | 1010 | 47 | 3.5×10⁻⁵ | Yes | NA |
| | Fine sand | Field coal tar | Yes | 250 | 1053 | 52 | 9.8×10⁻⁵ | Yes | Trace |
| | Oil sands (fine sand grain size) | solidified petroleum coating | Yes | 300 | 1066 | 35 | 1.7×10⁻⁴ | Yes | NA |

[1] 'Yes' = no observable contaminant remaining in the targeted combustion zone (via feel, smell, eyesight, or bulk density), 'No' = a portion of the combustion zone remained partially contaminated due to channelling of the oxidant around this area; the portion of the combustion zone contacted by oxidant has no observable contaminant remaining.
[2] 'Yes' = no compounds detected, 'Trace' = compounds detected near detection limit of instrument, amount too small to quantify, 'NA' = not analysed

*FIG. 10*

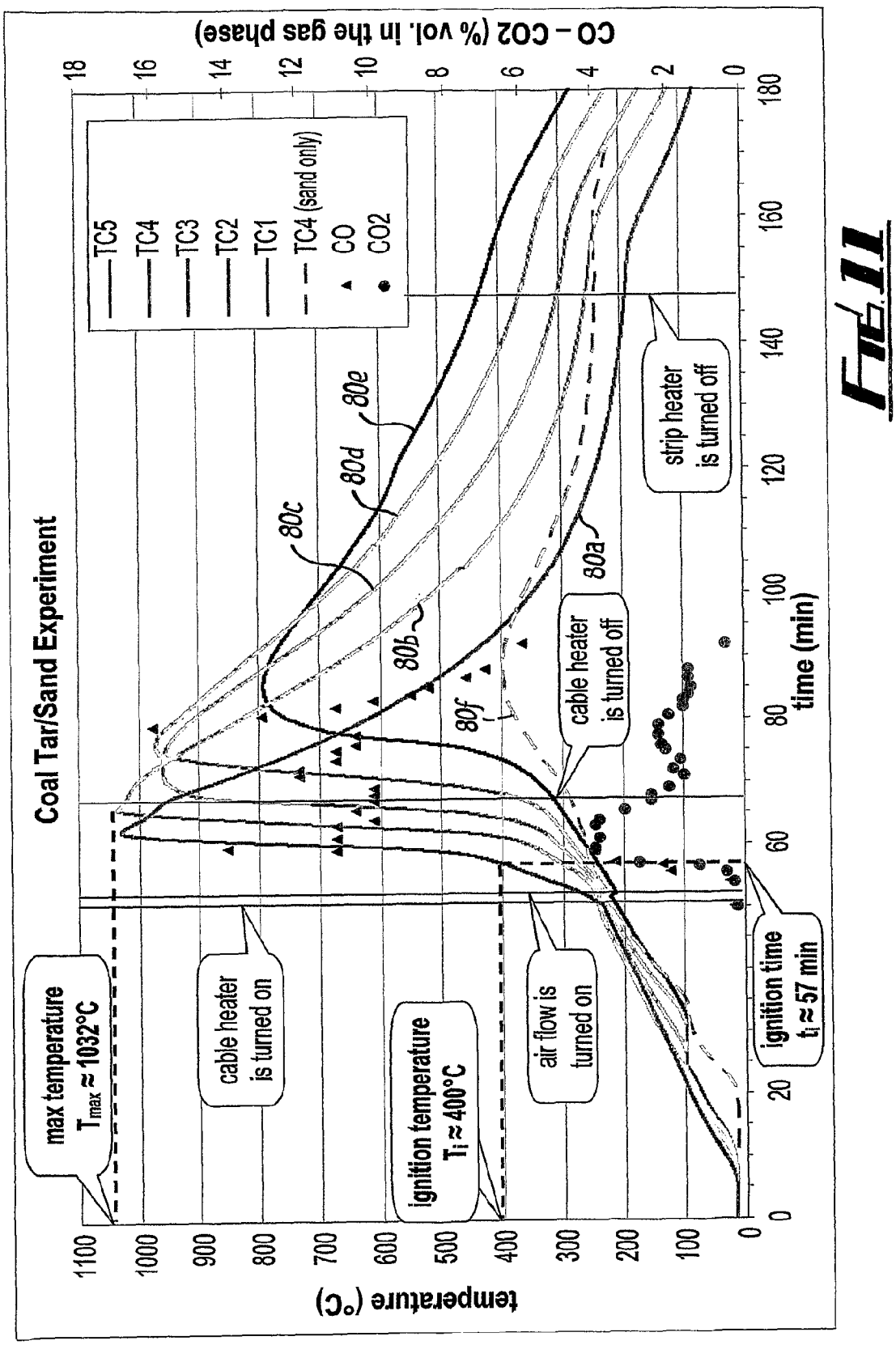

METHOD FOR REMEDIATING CONTAMINATED LAND

The present invention relates to a method and apparatus for remediating or cleaning land that is contaminated by a combustible material. In particular, but not exclusively, the present invention relates to an improved method and apparatus for the remediation of areas of land contaminated with non-aqueous phase liquids (NAPLs).

The contamination of ground water and surface water by historical unsound disposal practices and continuing accidental releases of hazardous industrial chemicals affects thousands of sites worldwide. Among the most common and problematic of these chemicals are immiscible organic liquids, particularly non-aqueous phase liquids (NAPLs). NAPLs that are lighter than water are known as LNAPLs; these include petrol (gasoline) and diesel. NAPLs that are denser than water are known as DNAPLs; these include chlorinated solvents such as trichloroethylene (TCE) and tetrachloroethylene (PCE), polychlorinated biphenyls (PCBs) and complex hydrocarbon mixtures (such as coal tar and creosotes). NAPLs pose a serious and long term threat to water quality, due to their prevalence, toxicity, persistence, and resistance to standard remediation efforts.

The United Kingdom Environment Agency has indicated that there are up to 20,000 sites in England and Wales affected by NAPL contamination, and which require treatment under the United Kingdom Environmental Protection Laws. Indeed, it is estimated that chlorinated solvents alone account for approximately 30% of ground water pollution instances in England and Wales. In the United States, the US Department of Defense estimates that approximately 11% of its 3,000 plus solvent impacted sites have DNAPL source zones remaining in the subsurface. Source zones are sub-surface regions containing immiscible liquid (NAPL), which can persist for decades or even centuries, and which continue to release dissolved phase contamination at concentrations in ground water which are usually well above those considered to present a risk to human health. In addition, these compounds are typically volatile and therefore also partition into the air phase present in the soil above the water table, from where these vapours can migrate above ground and into buildings. As such, NAPL source zones are responsible for persistent contamination of land, water and air.

A wide range of industries have produced NAPLs over the past century, including by-products and waste derived from: coal tar derived from gas manufacture (from coal), creosotes from wood preserving operations, and solvents used in the degreasing of electrical components and for dry cleaning. Contamination of the subsurface occurred by these immiscible organic liquids occurred at locations of manufacture, transport, storage, use, and disposal. In particular, in the past, it was common and permitted practice to dispose of these materials by pouring them into the ground after use. Only in the past 20 years has the risk from NAPLs been recognized, their handling been regulated, and approaches to the remediation of NAPL contaminated sites been sought. However, NAPLs are highly persistent in the subsurface and difficult to address satisfactorily with current remedial techniques. When recovered to the surface, they are hazardous to handle and costly to treat or dispose of safely.

Industrial by-product/waste materials typically form liquid or liquid/gas deposits, although in the case of certain materials, solid deposits may also be present. One typical situation where solid contaminants may be present is on sites where organic chemical explosives have been manufactured, and where production process and/or manufacturing process discharges have occurred. The discharges involved in the manufacture of the organic explosives 2,4,6-trinitrotoluene (TNT), 2,4-dinitrotoluene (DNT), hexahydro-1,3,5-trinitro-1,3,5-triazine (RDX), and octahydro-1,3,5,7-tetranitro-1,3,5,7-tetrazocine (HMX) are particularly problematic. This is because, under circumstances where the environmental temperatures are significantly lower than the discharge water temperatures (not uncommon—groundwater is typically at 10° C.), explosives may precipitate out of solution and create a separate solid phase material in the soil.

Another organic contaminant found as a solid phase in the subsurface is purifier waste, resulting from the cooling and purification of gas freshly manufactured from coal (a common practice in the early to mid 1900's). During the process, impurities were removed by passing the gas through "purifier beds" made up of either lime or wood chips impregnated with iron filings. The beds of purifier would eventually load up with tar and other materials and become unusable. This purifier waste (also referred to as "box waste") had a tendency to spontaneously ignite if left uncovered and was either shipped off site to landfills or used to fill low-lying areas on site. Purifier Waste is typically found as a dark mixture of wood chips with pieces of solid (typically tar) mixed in.

Several methods for dealing with NAPLs have been put forward, with varying success. For example, the standard way of dealing with areas of land contaminated with NAPLs is excavation and disposal, otherwise known as "dig and dump". This consists of identifying and exhuming the contaminated soil and transporting it to a landfill site, where it is deposited. However, this practice simply moves the contamination problem from one area to another while often increasing the risk of exposure by bringing the NAPLs above ground. This practice is now frowned upon as unsustainable, and has recently become much more expensive in the UK due to new legislation and landfill tax.

The first in-situ (i.e., within the ground) method that has been used in an effort to deal with NAPLs is the "pump and treat" technique. This involves installing a ground water recovery well downgradient of the NAPL source zone. Continuous pumping of the recovery well captures the dissolved phase compounds emanating from the source zone. The recovered contaminated water must be treated at surface. However, this technique is essentially a containment strategy for the dissolved phase plume created by the NAPL, and has been shown to be ineffective at remediating the source zone. As such, they often must be operated indefinitely simply to limit the spread of contaminated ground water.

Many treatment technologies exist for addressing dissolved phase compounds in groundwater. However, like "pump and treat", these do not address the source zone that continually "feeds" compounds to these groundwater plumes. There exist far fewer technologies for addressing NAPLs themselves in the source zone.

Various in-situ chemical treatments have been used in an attempt to remove NAPLs from contaminated sites. For example, in one technique, surfactants or alcohols are pumped into the ground through an injection well, and aid the dissolution and mobilisation of NAPL which can then be pumped out of a second, downgradient well. The resulting mixture of NAPL and contaminated water may then be separated at surface into aqueous and non-aqueous phases for treatment and/or incineration. However, this technique suffers from a number of disadvantages. In particular, it involves the continuous addition of expensive and sometimes hazardous chemical additives; may not be particularly effective in some subsurface settings; may lead to remobilization of DNAPLs downwards which worsens the situation; involves fluids that are difficult to separate from NAPLs or recycle; and recovers large volumes of fluids that require treatment.

A further chemical treatment for the in-situ removal of NAPLs from contaminated sites involves their oxidation. For example, potassium permanganate can be pumped into a contaminated site, which then reacts with the NAPLs by means of an oxidation reaction, to transform the NAPL into nonhazardous compounds. However, the success of this technique can be limited due to the reaction simultaneously forming mineral solids that block the pore space surrounding the NAPL, thereby preventing further contact between the reactants. In addition, the naturally occurring organic material in the soil often exerts a large oxidant demand, requiring additional oxidant to be injected. The use of large volumes of oxidant is typically expensive.

Biological techniques have also been used in an effort to remediate sites contaminated by NAPLs. Such bioremediation techniques typically involve adding nutrients and an organic food source to contaminated soil such that groups of bacteria in the soil multiply and interact to degrade hazardous compounds. Ex-situ bioremediation involves exhuming the contaminated soil and treating in a reactor or in mounds at ground surface. In-situ bioremediation has been implemented for treating dissolved phase compounds downgradient of the source zone, acting as a plume containment strategy but not reducing NAPL volume. There have been recent efforts to make bioremediation possible within the source zone itself; while some success been shown in some laboratory experiments, this has yet to be demonstrated in the field.

Several problems exist with bioremediation of NAPL source zones. The continuous input of additives (organic substrates and nutrients) can make the treatment costly. In addition, it is necessary to obtain a site specific balance of bacteria, food and nutrients for every contaminated site. The bioremediation technique is therefore site specific. Another problem associated with bioremediation techniques is that of 'biofouling', in which the pore space near the NAPLs and the pumping wells become blocked by excessive microbial growth. Furthermore, not all contaminated sites have the requisite bacteria naturally present at the site. In these situations, known biological degraders would need to be injected as well, in a process known as 'bio-augmentation'. However, in certain jurisdictions this practice is actively discouraged, and in many cases is not allowed, due to restrictions on the implantation of non-native organisms.

The in situ (i.e., in the subsurface) chemical and biological treatment techniques described above all involve injecting fluids into the subsurface upgradient of the source zone and rely on subsequent contact between the chemicals and the NAPL. However, a significant problem with all such fluid injection techniques is that achieving the desired flush of the source can be problematic. Fluid bypassing often occurs where the injected fluid tends to flow around the NAPL thereby limiting its exposure to and thus contact with a portion of the injected chemical. This occurs for primarily two reasons: NAPLs tend to rest upon low permeability lenses of subsurface material (e.g., silts or clays) which naturally divert flow away from them; and the NAPL itself blocks the pore spaces causing water or an injected fluid to flow more easily and quickly around the source zone. In addition, dilution of the injected fluids may cause their concentrations to decrease such that their effectiveness is diminished.

Another approach which has been employed in an effort to rid contaminated sites of NAPLs involves thermal remediation techniques, including steam flushing, electrical resistance heating (ERH), and electrical conductive heating (ECH). The benefits of thermal remediation technologies are that they may reduce the NAPL mass in a matter of months to years (in comparison to years to decades for the more passive technologies discussed above), and that they can be effective in low permeability media, since heat conduction is generally less affected than the flow of fluids by hydraulic properties.

Steam flushing involves the injection of steam to the subsurface to volatilize and decrease the viscosity of the NAPLs, thus assisting their mobilization towards a withdrawal well. ERH and ECH involve the implantation of large electrodes into the ground (at the source zone), and sustained heating of the water and/or soil itself. Thermal methods typically heat the subsurface to a temperature of approximately 100° C. In so doing, they aim not to destroy the contaminants in situ but rather to change their phase and/or properties so that they can be mobilized and recovered. A primary remediation mechanism is to volatilise NAPL compounds such that they may be collected from the air phase in the subsurface or at ground surface. Also common is recovery of liquid that is mobilized due to its reduced viscosity. In some cases, some NAPL compounds may be thermally degraded as absorbed heat causes endothermic degradation (pyrolysis) or reaction with water (hydrolysis). However, these techniques exhibit varied success and have a significant drawback. Specifically, the techniques require a large and continuous input of energy in order to achieve and maintain a given temperature. Thus, these techniques often prove to be prohibitively expensive.

In summary therefore, the prior art methods of remediating (or cleaning) sites contaminated with NAPLs generally have significant limitations in terms of the timescales over which they are operated, the effectiveness of the techniques used, and the costs incurred.

It is amongst the objects of embodiments of the invention to obviate or mitigate at least one of the drawbacks associated with the prior art.

Further aims and objects of the invention will become apparent from a reading of following description.

According to a first aspect of the present invention, there is provided a method of remediating land contaminated with a combustible material, the method comprising the steps of:
  locating a subterranean volume of combustible material in land to be remediated; and
  igniting the combustible material to combust the material and thereby remediate the land.

The invention thereby provides a method by which land contaminated with combustible materials may be cleaned or remediated by combusting the materials in situ. This overcomes problems associated with prior cleaning techniques such as "dig and dump". Combustion of the material may be self-sustaining in that it may only be necessary to supply sufficient energy to ignite the material; once ignited, combustion of the material may proceed as long as there is sufficient fuel (the combustible material) and oxygen for combustion to take place. This is in contrast with, for example, known thermal remediation processes, which require continuous energy input.

Materials including many common NAPLs as well as some solid organic contaminants are flammable and contain substantial energy. When burned, they release significant amounts of heat. For example, the heat of combustion (HOC) of TCE and chlordane relative to that of wood are 90% and 300%, respectively; shredded tires, with a HOC of only 5% of wood, have been successfully combusted in waste recovery schemes. Combustion involves a self-sustained exothermic reaction of a combustible material in the presence of an oxidant, oxidizing (and thereby destroying) the combustible material in the process. When the combustible material is embedded within a porous media, the porous media has a highly beneficial impact on combustion: the solid acts as energy store and then feeds that energy back into the reaction. This energy feedback mechanism means that an efficient, self-propagating combustion process is possible for conditions that otherwise lead to extinction. Applications in ex-situ incineration, porous burners and enhanced oil recovery indicate significant potential, but the concept of in situ combustion for subsurface remediation is novel.

It will be understood that the combustible material is subterranean in that it is below ground level or within the subsurface, and may comprise a fluid and/or a solid, or any combination thereof. However, most materials are anticipated as being predominantly in a fluid phase. It will also be understood that the subsurface is typically porous and may comprise soil or the like, with combustible liquids typically residing in pores defined between solid particles of the soil (or in the case of fractured rock environments, residing in the network of fractures between blocks of rock/clay and/or in the pore spaces of the rock/clay matrix itself).

A combustion front may be generated following ignition of the combustible material and may travel outwardly, away from a point of ignition and through the volume of combustible material. The combustion front may follow a path defined by factors including the shape of a fluid volume and a pathway defined along the interconnected pores in the soil. The combustion front should follow the distribution (i.e., path) of the combustible material away from the ignition point without the (above ground) operator knowing in advance the specific distribution (pathways). Thus, the process will also be self-guiding.

Preferably, the method comprises monitoring combustion of the material. Monitoring combustion of the material may comprise the steps of monitoring one or more parameters, including temperature in the land contaminated with the combustible material, at a plurality of locations. Monitoring combustion may also comprise monitoring by-products of the combustion process such as the constituents and/or volumes of gaseous by-products resulting from combustion of the material. The method may comprise monitoring combustion of the material in real-time, and thus during the combustion process. In many circumstances, existing NAPL remediation techniques are only evaluated in the field by mapping the distribution of NAPL and the downgradient gas/water concentrations before and then after treatment, and looking at the difference to determine the "effectiveness" of the technology. Real-time monitoring provides significant advantages over prior methods. Alternatively, or additionally, the method may comprise monitoring the extent of combustion of the material subsequent to combustion, that is, after combustion has ceased.

Monitoring combustion of the material, either in real-time or by monitoring the extent of combustion after combustion has ceased, may facilitate determination of the extent to which the material has been combusted and factors including the type of combustion that the material is or has undergone and a rate of progression of a combustion front through the material. For example, if a combustion front is progressing more slowly than anticipated, there may be a relative lack of oxygen present. Alternatively, if the combustion front is progressing faster than anticipated, there may be an excess of oxygen relative to the volume of material.

Accordingly, by monitoring combustion of the material, action may be taken in order to achieve an optimal or desired form and rate of combustion. For example, the method may comprise monitoring combustion of the material and supplying (or modifying the amount or ratio of the supply of) air/oxygen in one or more locations. Alternatively, the method may comprise supplying additional fuel, such as further combustible material, for example, to assist ignition of the volume of material. Alternatively, the method may comprise supplying a combustion suppressant such as nitrogen or water in order to suppress and thereby control combustion. In a further alternative, the method may comprise deactivating an ignition device (used to ignite the material) and/or reducing or terminating the addition of oxidant, to control (or suppress) combustion. As will be described below, this may control combustion depending upon the type of combustion occurring.

Flaming combustion refers to combustion that occurs in the gas phase. For example, when an accumulation of NAPL (e.g., kerosene) rests in an open container and is ignited, the heat will continuously volatilise the fuel, and the gaseous fuel combusts producing a flame. Flame combustion is also referred to as homogeneous combustion because at the location where combustion occurs both the oxidant (oxygen in the air) and the fuel are in the same (gas) phase, where they readily mix. Flame combustion consumes the fuel relatively quickly and generates relatively high temperatures (e.g., typically greater than 900° C.).

Smouldering combustion refers to combustion of a material on the surface of the solid/liquid material itself. For example, when a combustible material (e.g., tobacco) is compacted to form a porous solid (e.g., a cigarette) and is ignited, the oxidant (oxygen) diffuses into the surface of the material and the combustion proceeds on the tobacco surface. Smouldering is referred to as heterogeneous combustion because the oxidant (gas) and the fuel (liquid or solid) are not in the same phase. Smouldering typically proceeds slowly relative to flaming and generates lower temperatures (e.g., typically between 400° C. and 600° C.) but under specific conditions can achieve temperatures above 1000° C. By monitoring and controlling combustion, smouldering combustion can be promoted.

In particular embodiments, the method may comprise monitoring combustion in order to promote or maintain smouldering of the material. Alternatively, the method may comprise monitoring combustion in order to promote flame combustion. These different combustion regimes may be achieved by monitoring/controlling the supply/ratio of oxidant (air/oxygen/ozone). For example, smouldering, is oxygen deficient so that it can be controlled by managing the oxygen supply; can propagate at lower temperatures; and requires less oxidant. Accordingly, by monitoring combustion and controlling the supply of oxidant, smouldering combustion can be promoted. If required, a combustion suppressant such as nitrogen may be supplied to maintain combustion in a smouldering state. The method may comprise super-adiabatically combusting the material, such that the material undergoes super-adiabatic combustion. In super-adiabatic combustion, the combustion front experiences minimal movement with migration of fuel and oxidizer towards the reaction zone dominating the combustion process.

The method may comprise controlling the extent of combustion of the material, and may comprise extinguishing combustion after a desired or determined time period; and/or following travel of a combustion front a desired or determined distance through the material and thus at a desired location.

Extinguishing combustion at a desired time may be achieved as follows. If combustion is not yet thermally sufficient so as to be thermally self-sustaining, and thus an ignition element used to ignite the material is still activated, the ignition device may be deactivated to thereby extinguish combustion. If combustion is progressing in a thermally sufficient, thermally self-sustaining mode, and thus the ignition element is off, but combustion is oxygen deficient/starved so that progression relies on the continued addition of an oxidant (e.g., air/oxygen/ozone), then the flow of oxidant may be reduced or discontinued to thereby extinguish combustion. An alternative way of achieving this will be by diluting the oxidizer flow with a suppressant such as nitrogen or water. If combustion is progressing in the absence of oxidant supply and without a requirement for an ignition device to remain activated, then a combustion suppressant such as nitrogen or water may be injected; this may be of a particular utility for the remediation of land contaminated with chemical explosives which generally have embedded oxidants.

Extinguishing combustion at a desired location may be achieved by creating one or more combustion barriers. In embodiments of the invention, a site boundary or perimeter may be formed by setting up one or more combustion barriers. The step of forming the one or more barriers may comprise constructing a physical barrier. For example, a rigid sheet-pile wall (e.g., made of steel) may be driven into the subsurface to form a cut-off wall. Or, for example, a time-setting material, such as cementitous material containing bentonite, may be injected into the ground, typically into an excavated trench or borehole, to form a cut-off wall. Alternatively, or in addition, the step of forming the barrier may comprise forming a fluid suppression wall, such as a gas wall, by injecting fluid into the ground in a plurality of locations. For example, a plurality of boreholes/wellbores may be drilled, and/or trenches may be formed (filled with gravel or the like) and a fluid suppressant injected through the boreholes and/or into the trench. These techniques may provide a barrier which extinguishes the combustion process at the boundary thereby defined.

Preferably the material is a fluid which is non-aqueous and therefore relatively immiscible in water, but may also or alternatively be a solid. The combustible material may be a NAPL, and may in particular be a DNAPL or LNAPL.

The method may comprise accessing the volume of combustible material from surface. Accessing the volume of material may comprise drilling an access borehole, passage or the like from surface to a location intersecting the volume of material or to a location adjacent the volume of material. This may facilitate subsequent ignition of the combustible material. The borehole or the like may be substantially vertical, or may be a horizontal borehole. It will be understood that a horizontal borehole is one which includes at least a portion which is deviated from the vertical; such boreholes are known in the oil and gas exploration and production industry, and facilitate access to the material volume from a laterally spaced location. Drilling a horizontal borehole may also facilitate subsequent ignition of the material and propagation of a combustion front through the material. This is because the borehole may be directed to intersect the volume at or adjacent a lower boundary or perimeter of the volume. The combustion front may therefore be initiated at the bottom of the contaminated region and propagate upwards. In this fashion, buoyant or forced air flows may be generated, assisting the combustion process. This may promote conservation of energy (heat), improving efficiency of the method, as heat generated during combustion rises or is pushed by a forced air flow upwardly through the land, assisting in self-sustainment of the combustion process. This may make it possible to burn very low concentrations of fuels in the presence of heat sinks (such as areas of or containing relatively large volumes of water). In addition, ignition from below may permit material (NAPLs) that are mobilized by their reduced viscosity (due to increased temperature) to trickle downwards and remain within the combustion zone, thereby still being combusted or alternatively being recovered in the ignition borehole or another borehole dedicated to that purpose.

In an alternative, the borehole may be directed to intersect the volume of material at or adjacent to an upper boundary and the combustion front propagated downwardly through the material volume. Alternatively, the borehole may be directed to intersect the volume of material at a lateral boundary and the combustion front propagated horizontally across the material volume, or located centrally and combustion propagated outwardly form the centre of the material volume towards its extremities.

The step of igniting the combustible material may comprise locating an ignition device within or adjacent to the volume of material and may in particular comprise locating the ignition device extending along the borehole or the like from the surface to the location intersecting with or adjacent to the volume of material. Where a combustion regulating fluid (e.g., oxidant or suppressant) is to be injected into the ground, an injection device may be provided with the ignition device and thus co-located in the borehole.

Preferably, combustion by-products comprising gases and the like are collected for analysis and/or disposal. The combustion by-products may be collected at surface and contained in a suitable storage chamber. Additionally or alternatively, where access to the material volume is achieved through a borehole or the like, the by-products may be returned to surface along the same borehole or other boreholes provided expressly for this purpose. Accessing the combustible fluid volume through a borehole(s) or the like may therefore additionally facilitate capture of gaseous by-products from the combustion process. In the presence of significant amounts of water in the subsurface, a fraction of gaseous products (e.g., carbon dioxide, which is highly soluble) may dissolve into the water and thus not be collected.

The method may comprise monitoring combustion byproducts in the land following combustion and/or during combustion. This may be achieved by taking and analysing samples of the soil/groundwater.

According to a second aspect of the present invention, there is provided apparatus for remediating land contaminated with a combustible material, the apparatus comprising an ignition device, the ignition device adapted to be located below ground level for igniting a subterranean volume of combustible material in land to be remediated, to combust the material and thereby remediate the land.

The ignition device may be adapted to heat the combustible material in order to ignite the material, and may comprise an electric resistance heater. The electric resistance heater may comprise an electric element or wire which heats up when an electric current is passed through the element, and the element may have a corrosion resistant coating or cover adapted to shield the element from corrosive materials.

Alternatively, the ignition device may be adapted to generate an electrical discharge or spark or other source of heat to thereby ignite the material. If required, the ignition device may comprise a burner or the like, coupled to a fuel supply, for generating a flame or other source of heat to ignite the material. It will be understood that, with certain materials, the flame or other source of heat may only require to be maintained for as long as it takes for the combustible material to ignite.

The apparatus may comprise at least one fluid injection device for injecting a fluid (particularly a gas) adapted to promote combustion into the material volume, such as an oxidant comprising or containing air/oxygen/ozone. This may facilitate control of combustion of the material by enabling injection of oxidant. The fluid injection device may comprise at least one flow line extending from surface into the volume. Optionally, the fluid injection device may comprise a manifold having a plurality of outlets, the manifold connected to a main fluid supply line, for supply of fluid through a single supply line to a plurality of locations within the volume. The supply line may be contained within the ignition borehole either alongside the ignition device or may be adapted to be inserted subsequent to removal of the ignition device.

The fluid injection device may also be for supplying a combustion suppressant such as water or nitrogen, into the material volume, for selectively extinguishing combustion, or restricting combustion of uncombusted material. The fluid injection device may comprise separate flow lines for the flow of oxidant/combustion suppressant or may be adapted for selective supply of either.

The apparatus may comprise at least one sensor for monitoring combustion of the material. Preferably, the apparatus comprises a plurality of sensors spaced throughout the volume. The apparatus may comprise a temperature sensor and/or a gas sensor for determining the volume and/or constituent of gaseous by-products resulting from combustion of the fluid.

An embodiment of the present invention will now be described, by way of example only, with reference to the accompanying drawings, in which:

FIG. 6 is a view of the area of land contaminated with a combustible fluid shown in FIG. 5, shown in a variation on the method of FIG. 5;

Figure 9:
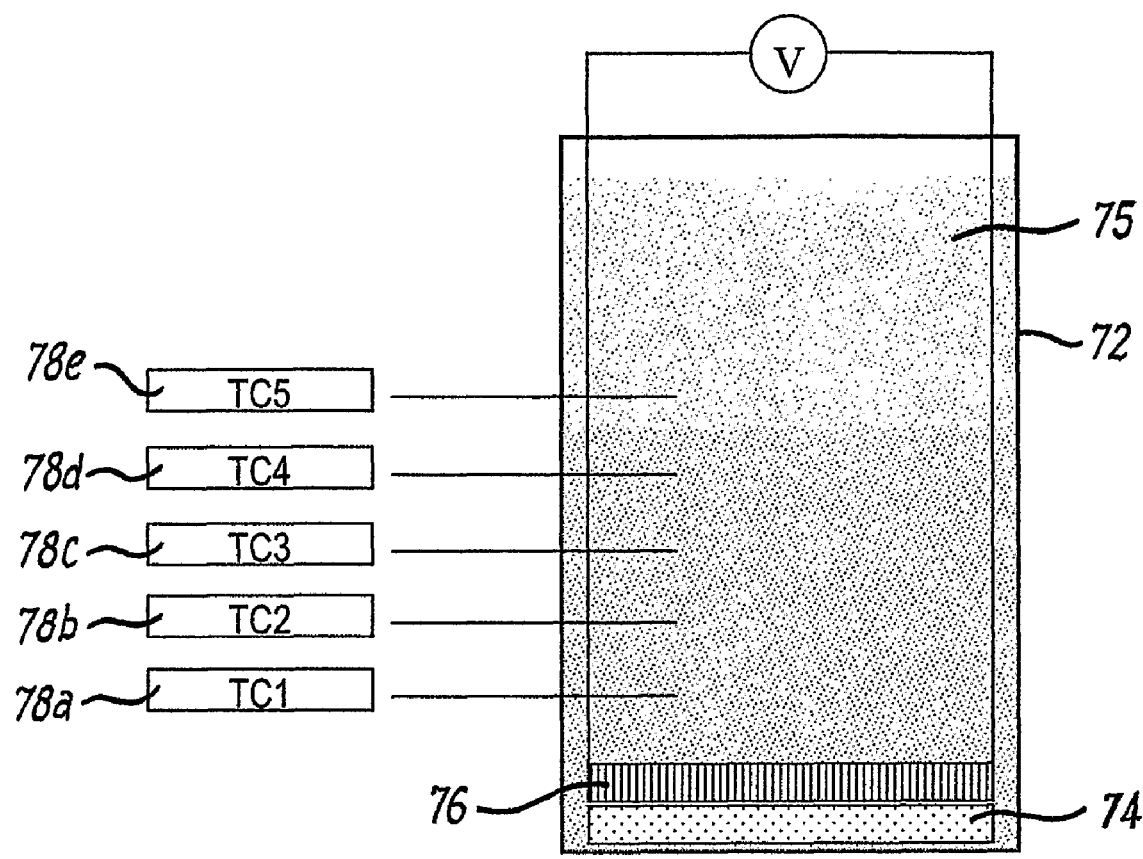

FIG. 9 presents a schematic illustration of a equipment utilised in an experiment conducted to prove viability of the method and apparatus of the present invention;

FIG. 10 is a table detailing the results of further experiments conducted to prove viability of the method and apparatus of the present invention; and FIG. 11 is a graph showing the measured temperature vs. time, as well as the percentage (by volume) of CO and $CO_2$ in the combustion products, measured during a coal tar/sand experiment carried out utilising the equipment of FIG. 9.

Figure 1:
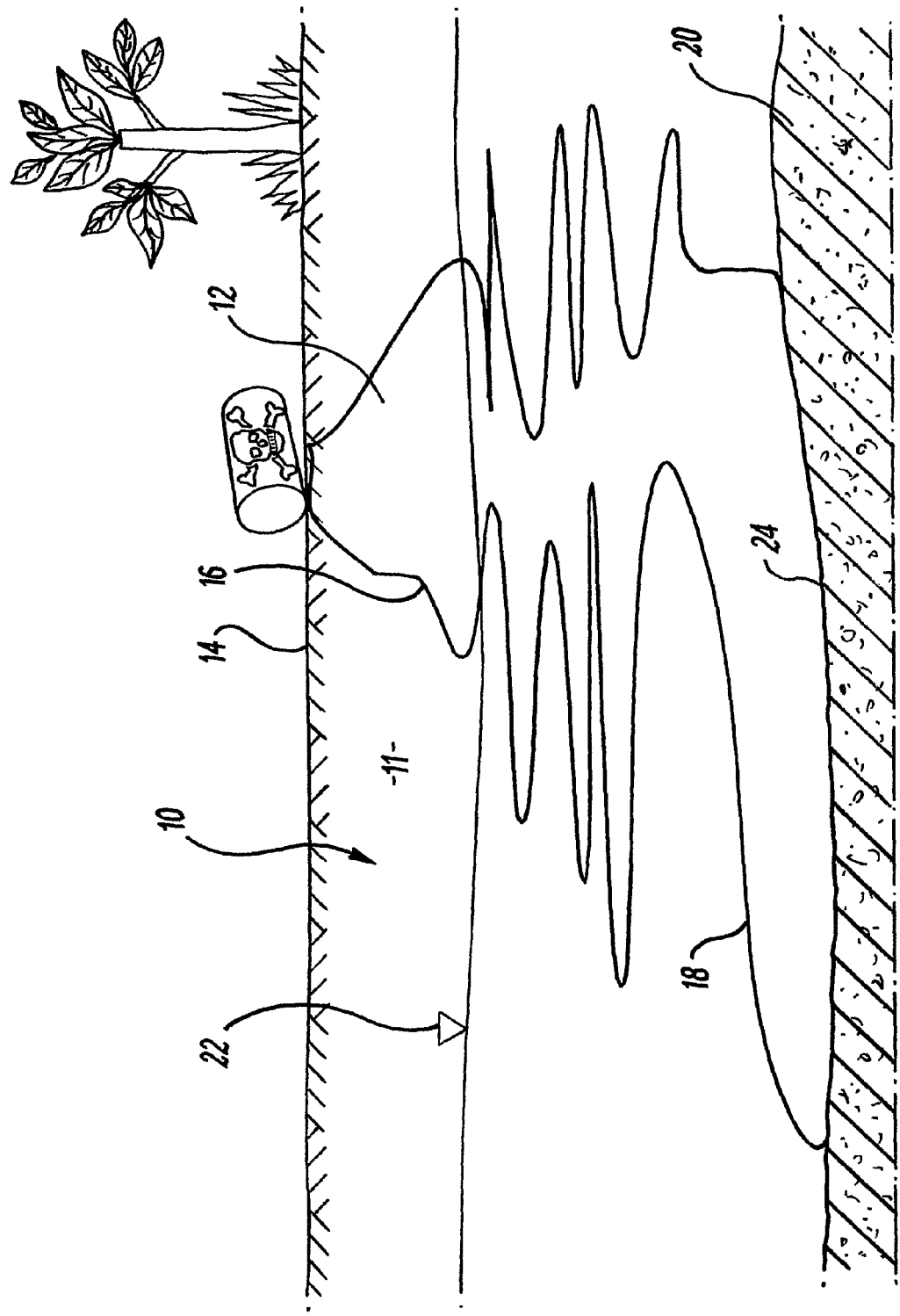
FIG. 1 is a schematic, cross-sectional view of an area of land contaminated with a combustible material.

Turning firstly to FIG. 1, there is shown an area of land 10 which has been contaminated with a combustible material, in particular, a combustible fluid 12. The combustible fluid typically comprises a NAPL and may in particular comprise a DNAPL which may be a chlorinated solvent such as trichloroethylene, tetrachloroethylene, or a complex hydrocarbon mixture such as coal tar or creosote. The DNAPL 12 may have been previously disposed of by pouring onto a surface 14 of the land 10, or may be the result of an accidental spillage. As shown in the Figure, the DNAPL has permeated down through soil 11 in the area 10, and has formed a non-uniform volume or source zone 16 of contamination. It will be understood that the shape of the volume 16 is dependent upon a number of factors including the volume of NAPL released, the physical fluid properties of the NAPL, and the spatial distribution of soil or rock permeability in the region of the land 10. The DNAPL 12 has formed a number of NAPL 'pools' (i.e., areas of stable NAPL that is connected through a large number of pores in the soil/rock) including a lower pool 18, which has accumulated on an impermeable rock layer 20. The DNAPL 12 may also include areas of 'residual' NAPL in which disconnected NAPL blobs (single pore) and ganglia (spanning several pores) are trapped in the pore space, typically in a pathway through which NAPL passed but did not accumulate in a pool.

The DNAPL 12 shown in FIG. 1 has permeated down through the soil 11 in the area of land 10 to a level below the current water table 22. Accordingly, over a period of time, compounds within the DNAPL 12 become dissolved out of the volume 16, mixed in with the groundwater, and flow into a watercourse such as a stream, river or the like, creating a pollution problem. The present invention is directed to a method of remediating or cleaning the contaminated area of land 10 (i.e., the source zone), as will now be described with reference also to FIG. 2. It will be noted that the method also applies to LNAPL scenarios, except that the LNAPL does not substantially penetrate the water table; rather it forms a lens that sits atop it (and often depresses it locally around the LNAPL pool), as will be described in more detail below.

It will also be understood that the likely phase or phases of the material present in the volume 16 (liquid, gas/vapour and solid) is dependant upon the contaminant material and environmental conditions such as ambient temperature and pressure, and the presence of groundwater. Thus under other circumstances, gas/vapour and/or solids may also or alternatively be present in the volume 16.

In general terms, the method comprises remediating the contaminated area of land 10 by firstly locating the subterranean volume of DNAPL 12. This may be achieved by utilising one or a combination of a number of techniques; for example, using remote detection geophysical equipment (not shown), or by drilling and sampling (for soil, gas, or water) a number of test wells or boreholes (not shown) at a number of locations and depths spaced around the surface 14 in a suspected contaminated area of land. This facilitates determination of the general shape and volume 16 of the area of land 10 contaminated with the DNAPL 12. In the illustrated example, and as discussed above, the volume 12 includes a lower pool 18 which rests upon the impermeable rock layer 20; however, such a lower bounding pool is not a prerequisite for the method.

Once the volume 16 has been located using such techniques, the area of contaminated land 10 is remediated by igniting the DNAPL 12, to thereby combust the DNAPL. This is achieved by drilling a borehole 26 from the surface 14, extending through the soil 11 to a location 28 adjacent the lower boundary 24 of the fluid volume 16. Such drilling techniques are known in, for example, the oil and gas exploration and production industry. The borehole 26 is deviated, to facilitate access to the lower boundary 24, although a vertical borehole may be drilled through the volume 16 to the location 28.

Following drilling of the borehole 26 and, if required, lining with suitable tubing (such as lengths of interconnected casing or liner), a gas injection manifold and a material ignition device 30 is run into the borehole 26 from surface 14 and down to the location 28. The device 30 is connected to control equipment and to a source of compressed air/oxygen/ozone (not shown) at surface 14 via an umbilical 32. The device 30 also comprises a manifold 31 having a plurality of gas outlets 33.

The ignition device 30 includes a sheathed cable heater or wire (not shown) which, when activated, rapidly heats up to in-turn heat the DNAPL 12 that has entered within the screen of the borehole 26 and in the area surrounding the device 30. A suitable material for the cable heater sheath is INCONEL®, although other materials may be utilised. This causes the DNAPL 12 to ignite, thereby commencing combustion of the DNAPL. The sheath protects the heater from exposure to corrosive compounds present in the ground, particularly the DNAPL 12 itself. In an alternative arrangement, when it is desired to combust the DNAPL 12 in the volume 16, an electrical discharge or spark (or indeed any other means of producing heat) is generated by the device 30, by providing a suitable control signal from surface, thereby igniting the DNAPL 12. Once the DNAPL 12 has been ignited, a combustion front 34 is generated, as shown in the schematic view of FIG. 3, which travels through the volume 16 from the location 28, the combustion front spreading outwardly from the device 30.

Oxidant may be injected into the subsurface through the ignition borehole manifold 31. The porous nature of the soil 11 in the area of land 10 and the injection of oxidant at the same location as the ignition ensures forward (in the direction of the flow) propagation of the combustion front, whereby energy is recovered from a hot, burnt region 16a of the DNAPL volume and is transferred to an un-burnt region 16b. It is likely that combustion will proceed in smouldering mode, with combustion occurring on the material surface and oxidant diffusing into that surface. Following ignition, the combustion front 34 travels through the volume 16 to combust the remaining pools of DNAPL 12 which are in fluid communication with the pool 18, as indicated by the arrows in FIG. 2. Areas of residual DNAPL are combusted as well due to the ability of the porous media to retain and transmit temperatures that support combustion, even when the NAPL is not in continuous fluid connection throughout the pore space. Gaseous by-products of the combustion process pass upwardly through the soil to the surface 14 and may be allowed to pass into the atmosphere, or may be collected for further treatment and/or storage using appropriate collection and storage equipment (not shown). The gaseous by-products may also be drawn off through the borehole 26 (or other installed boreholes for that purpose) and collected in a similar fashion. It is possible that a fraction of the combustion products will condense back to the liquid phase when in contact with cold soil or water above the combustion front. Generally, the combustion products will be expected to be mostly water, CO, and CO2.

The method therefore facilitates remediation of the contaminated area of land 10 by combustion of the DNAPLs 12 in the volume 16.

The method and apparatus of the invention will now be described in more detail, with reference also to FIG. 4, which is an enlarged, schematic illustration of the soil 11 in the contaminated volume 16.

Figure 3:
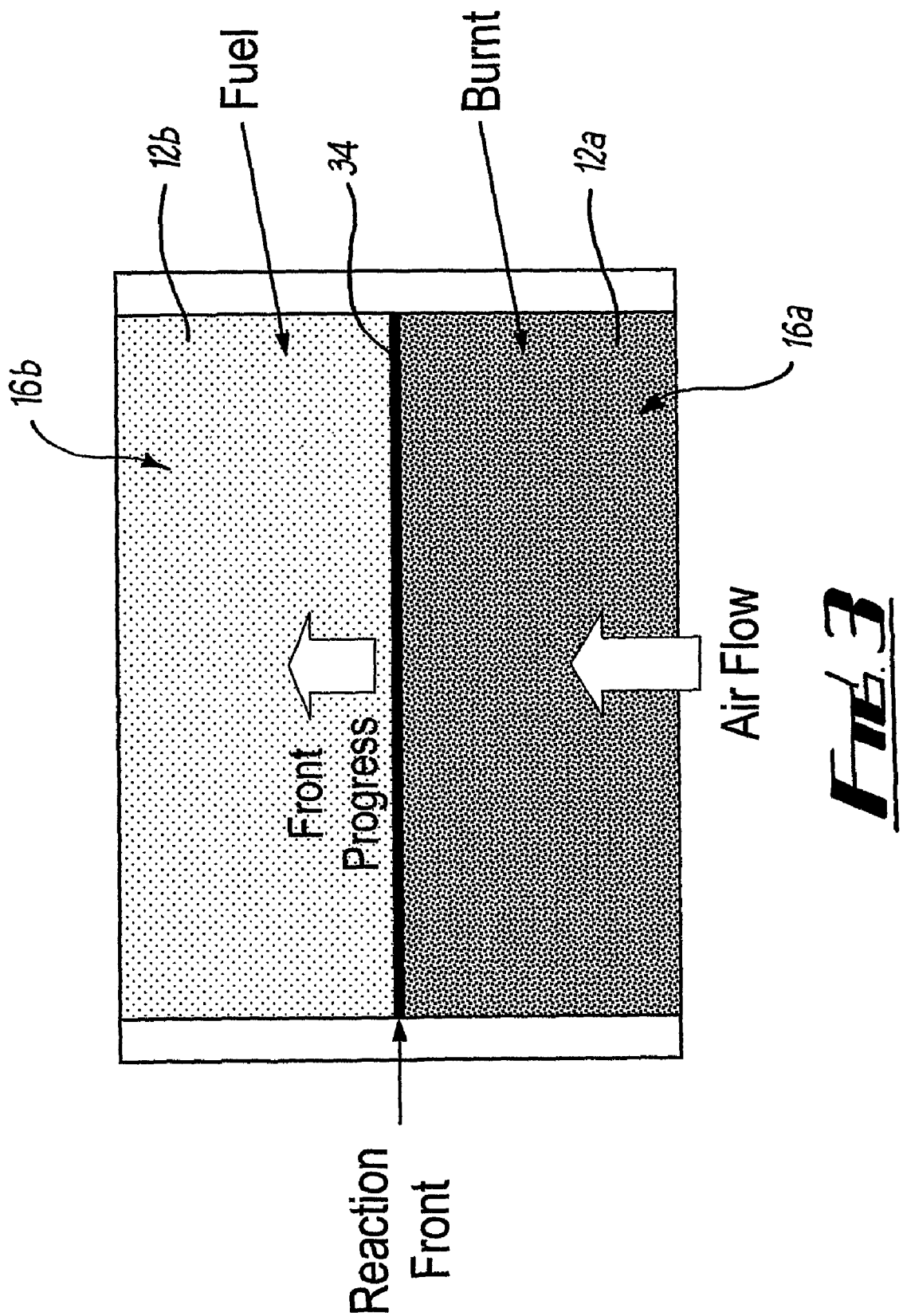
FIG. 3 is a schematic view illustrating progression of a combustion front through a volume of the combustible material shown in FIG. 1.
Figure 4:
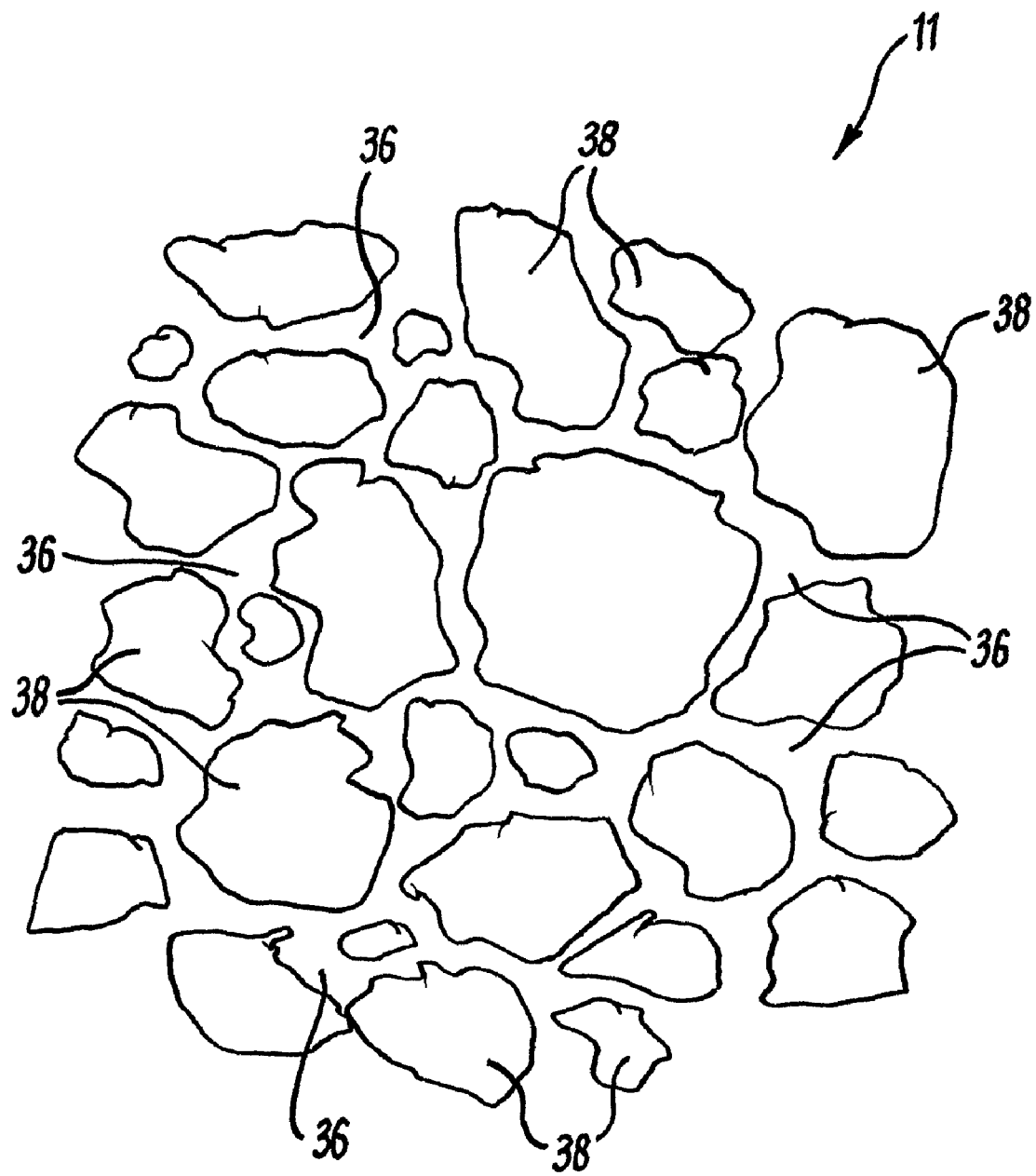
FIG. 4 is an enlarged schematic view of soil in the contaminated land shown in FIG. 1.

The DNAPL 12 permeates the soil 11 in the land 10 from the surface 14, and resides within the interconnected pore spaces 36 between soil particles 38, as shown in FIG. 4. However, it will be understood that the NAPL can also be contained within open fractures or fissures in a fractured rock/clay environment and/or in the consolidated porous matrix within which the fractures are embedded. Combustion of hydrocarbon fuels such as the DNAPL 12 within a porous matrix like the soil 11 generates a self-sustaining exothermic reaction within the pore spaces 36, during which heat is transmitted from the burning DNAPL 12a (FIG. 3) to both the pore spaces 36 and to the solid matrix (the soil particles 38). The presence of the porous media has a significant, beneficial impact on the combustion process in that the solid particles 38 have a high thermal inertia, thereby heating up and storing energy from the combustion reaction. Transmission of this heat through the porous media and via the heated oxidant (gas) travelling in the same direction as the combustion front can create a preheated region ahead of the front. In this way, much of the released energy can be delivered back to the reaction when it reaches the preheated location. Heat losses are therefore small allowing propagation of a combustion front even for very low concentrations of fuel and/or oxidant.

This energy feedback mechanism thus could result in temperatures in the reaction zone 34 significantly exceeding those typically possible for a given DNAPL 12. The combustion products will release most of their energy to the uncombusted DNAPLs 12b near the combustion (i.e., reaction) front 34, consequently leaving the immediacy of the combustion front region cold. In this way, an efficient self-propagating combustion process is possible in conditions that would otherwise lead to extinction of the combustion process.

The propagation rate of the exothermic reaction through the soil may also be significantly influenced by the direction of oxidiser flow, that is the direction of flow of oxygen carrying air. Accordingly, the method may involve the supply of air (or alternative mixtures of oxygen, nitrogen and other gases, e.g., ozone) to the soil in the area 10 during the combustion process. Indeed, the propagation rate of an exothermic reaction through the porous matrix of the soil 11 is significantly influenced by the direction of air (oxidizer) flow. FIG. 3 demonstrates how forward propagation uses injected oxidizer (air/oxygen) to recover energy and thereby assists propagation of the reaction. When addressing fuels (NAPLs) of low calorific output, very low fuel concentration, or in the presence of thermal sinks such as water, it is necessary to ensure that most of the energy generated by the exothermic reaction is recovered by the un-burnt fuel and oxidizer. Thus, propagation will generally be in a forward mode, as illustrated in FIG. 3. Within forward mode, three regimes can be identified based upon oxidizer flow rate: excess heat causing reaction front acceleration; shortage of heat causing deceleration; and heat accumulation exactly at the reaction front 34. This ideal third condition is known as super-adiabatic combustion. The specific regime achieved in any application can therefore be manipulated depending on the desired outcome, by controlling injection of air/oxygen through the injection device 30, and/or supply of a suppressant such as nitrogen or water, as will be described below. The propagation rate is also affected by pore 36 diameter of the soil 11 and the fraction of porosity occupied by fuel, air and other, non-reacting materials.

Propagation of a forward reaction front within a porous matrix such as the soil 11 can subsist within a wide range of conditions. The most important variables are the nature of the porous medium, the thermal properties of the combustible material, and the supply of oxygen. For large airflow rates (large oxygen supply), there is a large release of energy and propagation of the reaction front will accelerate. If the oxygen supply is reduced, the energy produced decreases and the reaction front will decelerate, further reduction of the oxygen supply can lead to extinction. Under these conditions, exothermic reactions result mostly from oxidation on the liquid fuels' surface; this mode of combustion is termed smouldering (e.g., a cigarette). Smouldering typically proceeds slowly relative to flaming and generates lower temperatures (e.g., typically between 400° C. and 600° C.) but under specific conditions can achieve temperatures above 1000° C. In addition, smouldering is possible at extremely low air-to-fuel ratios, and even in the absence of any external oxygen supply. Thus a range of operating regimes is possible: slow NAPL smouldering is likely in the absence of air-filled porosity, while periodic or continuous air (oxygen) injection (through the device 30) will increased temperatures and accelerated propagation of the burning front (i.e., remediation) through the source zone.

Thus to achieve optimum combustion and thereby progress of the combustion front 34 through the volume 16 of DNAPL 12, combustion of the DNAPLs may be monitored. This may be achieved by monitoring the temperature of the soil in and around the volume 16 at a number of locations spaced throughout the volume and surrounding soil, using suitable temperature sensors (e.g., thermocouples; three shown in FIG. 2 and given the reference numerals 40, 42 and 44). These sensors 40, 42 and 44 are located in small boreholes or passages 46, 48 and 50 drilled from the surface 14 into the soil in the volume 16 and surrounding area. Equally, the constituents and/or volume of the gaseous by-products resulting from the combustion process may be monitored either at surface 14 or by sampling at various locations throughout the volume 16, in a similar fashion as for obtaining temperature data. These gaseous by-products may also or alternatively be extracted through the borehole 26. By monitoring the temperature and constituents/volume of the gaseous by-products, the nature of the combustion occurring can be determined in real-time, enabling modifying action to be taken, if required. For example, by varying oxygen supply with consequential effect upon propagation of the combustion front 34. In the circumstances where air or oxygen is supplied during the combustion process, this may be either on a continuous basis or at periodic intervals, as required. Also, oxidant may be supplied at a single location or at multiple locations to facilitate progress of the combustion front throughout the source zone, as will be described below.

Figure 2:
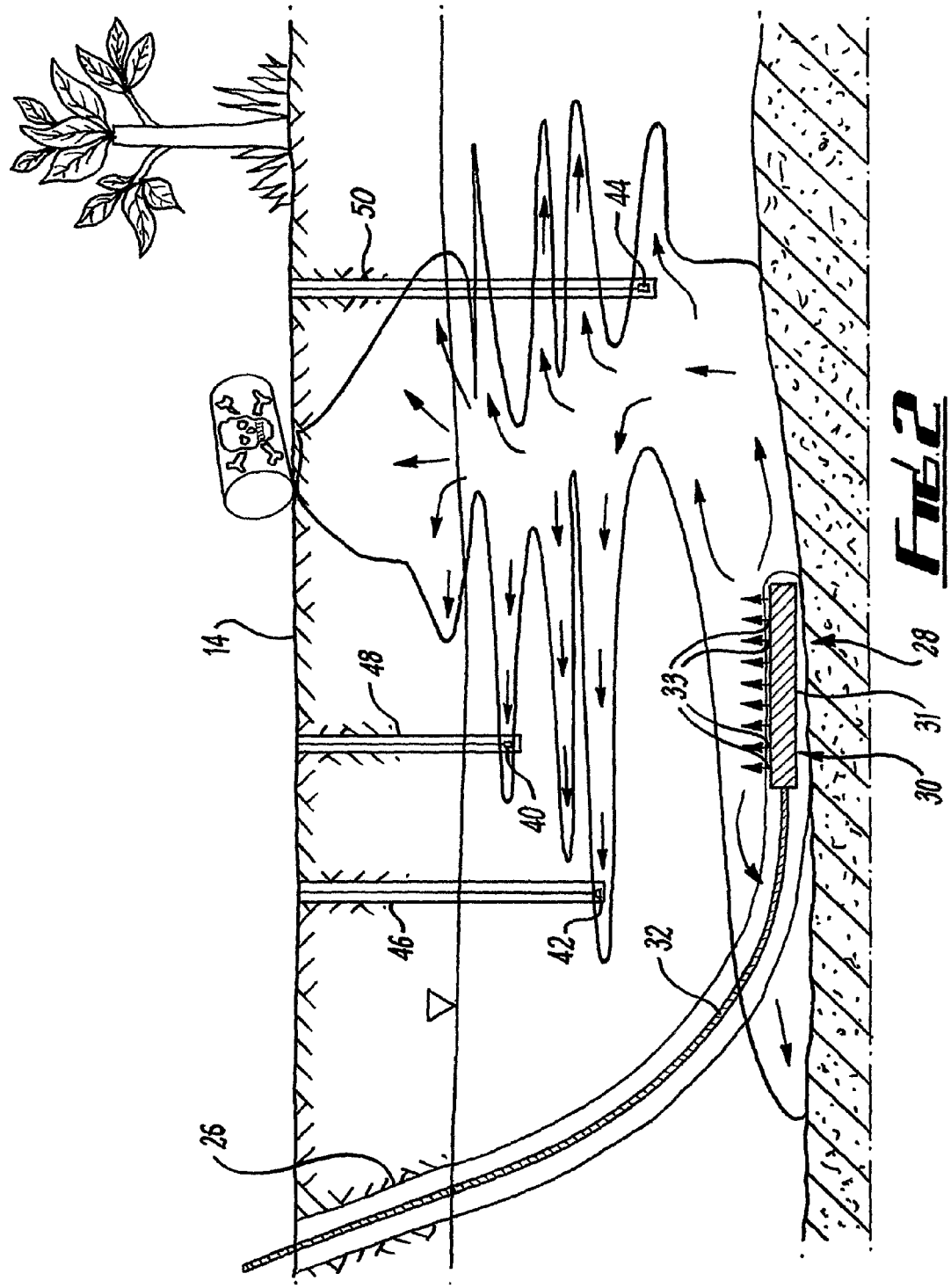
FIG. 2 is a view of the area of land shown in FIG. 1 during remediation utilising a method according to an embodiment of the present invention.
Figure 5:
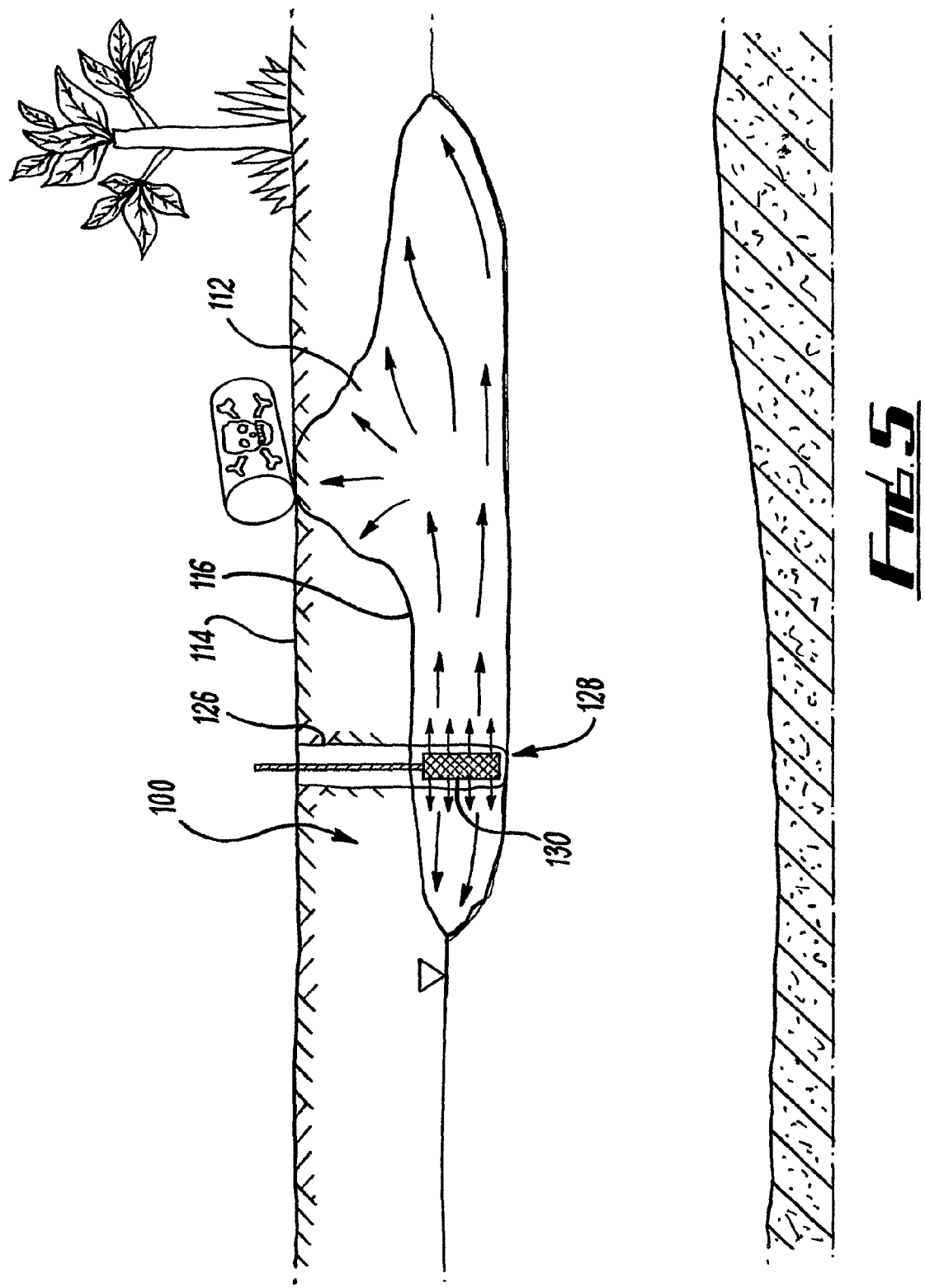
FIG. 5 is a view similar to FIG. 2 of an area of land contaminated with a combustible material, shown during remediation utilising a method according to an alternative embodiment of the present invention.

Turning now to FIG. 5, there is shown a view similar to FIG. 2 of an area of land contaminated with an LNAPL such as petrol (gasoline), jet fuel, heating oil, or diesel. In the Figure, the area of land is designated 100 and the LNAPL is given the reference numeral 112. The LNAPL differs from the DNAPL 12 illustrated in FIG. 1 in that it is lighter than water and thus tends to collect in pore spaces or cracks in rock/clay formations on or above the existing groundwater table (the groundwater table is essentially the upper surface of the water-saturated zone, above which air partially fills the pore space).

The method employed in remediating the area of land 100 to remove the LNAPL 112 is essentially similar to that described above in relation to FIGS. 1 to 4, and only the substantial differences will be described herein. Like components of the apparatus utilised to clean the land 100 with the apparatus used to clean the land 10 shown in FIGS. 1 to 4 are given the same reference numerals, incremented by 100.

In the illustrated embodiment, a vertical borehole 126 has been drilled from surface 114 to a location 128 adjacent a lower boundary or perimeter of a fluid volume 116 of LNAPL 112. An ignition device 130 is inserted and then activated to combust the LNAPL 112 in the fluid volume 116. Combustion of the LNAPL 112 is monitored and by-products optionally collected in the same fashion as that described above.

Turning now to FIG. 6, there is shown a view of the area of land 100 contaminated with LNAPL 112 shown in FIG. 5. In FIG. 6, however, it is desired to limit travel of the combustion front through the volume 116 of LNAPL from the ignition point, so that the combustion front does not pass into soil present in an area 52. This is achieved by drilling a borehole 54 from surface, running-in a combustion suppressing device 56, and injecting a combustion suppressing fluid 58 (such as water or nitrogen) into the contaminated soil, as indicated by the arrows in the Figure. The injected fluid forms a barrier 60 which restricts passage of the combustion front into uncombusted LNAPL 112 in the area 52.

Turning now to FIG. 7, there is again shown a view of the area of land 100 contaminated with LNAPL 112 shown in FIG. 5. Once again, it is desired to limit travel of the combustion front through the volume 116 of LNAPL from the ignition point, so that the combustion front does not pass into soil present in an area 52. In the illustrated embodiment, this is achieved by constructing a physical combustion suppressing barrier 62. The barrier 62 is typically formed by excavating a trench 63 and pouring a time-setting bentonite based cementitious material 64 into the trench. Once the material 64 has set, a solid barrier 62 is created preventing travel of the combustion front into the area 52. Alternative methods may be employed for forming the barrier 62. For example, metal sheets (not shown) may be pile-driven into the ground.

Figure 7:
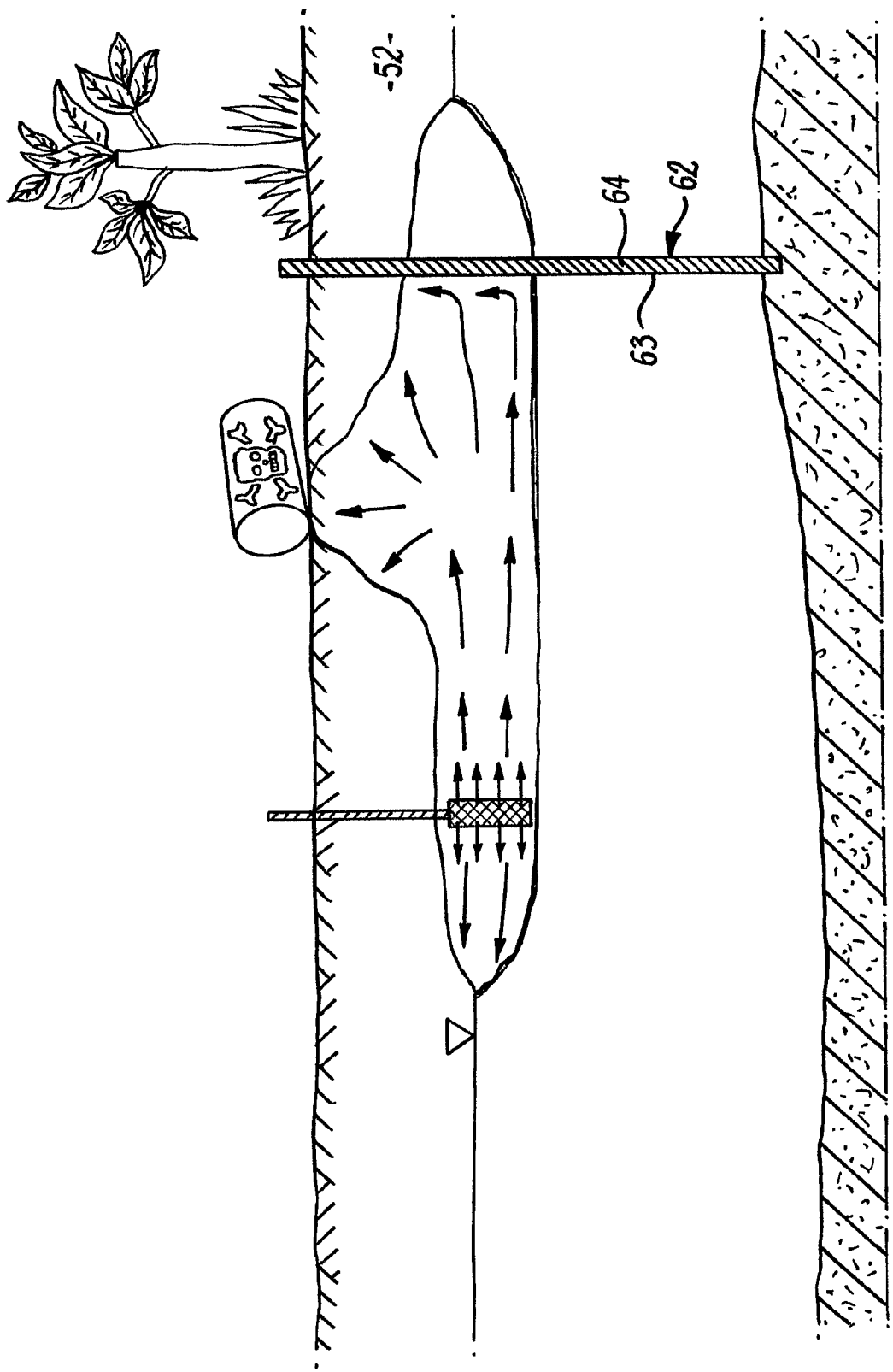
FIG. 7 is a view of the area of land contaminated with a combustible fluid shown in FIG. 5, shown in a further variation on the method of FIG. 5.
Figure 8:
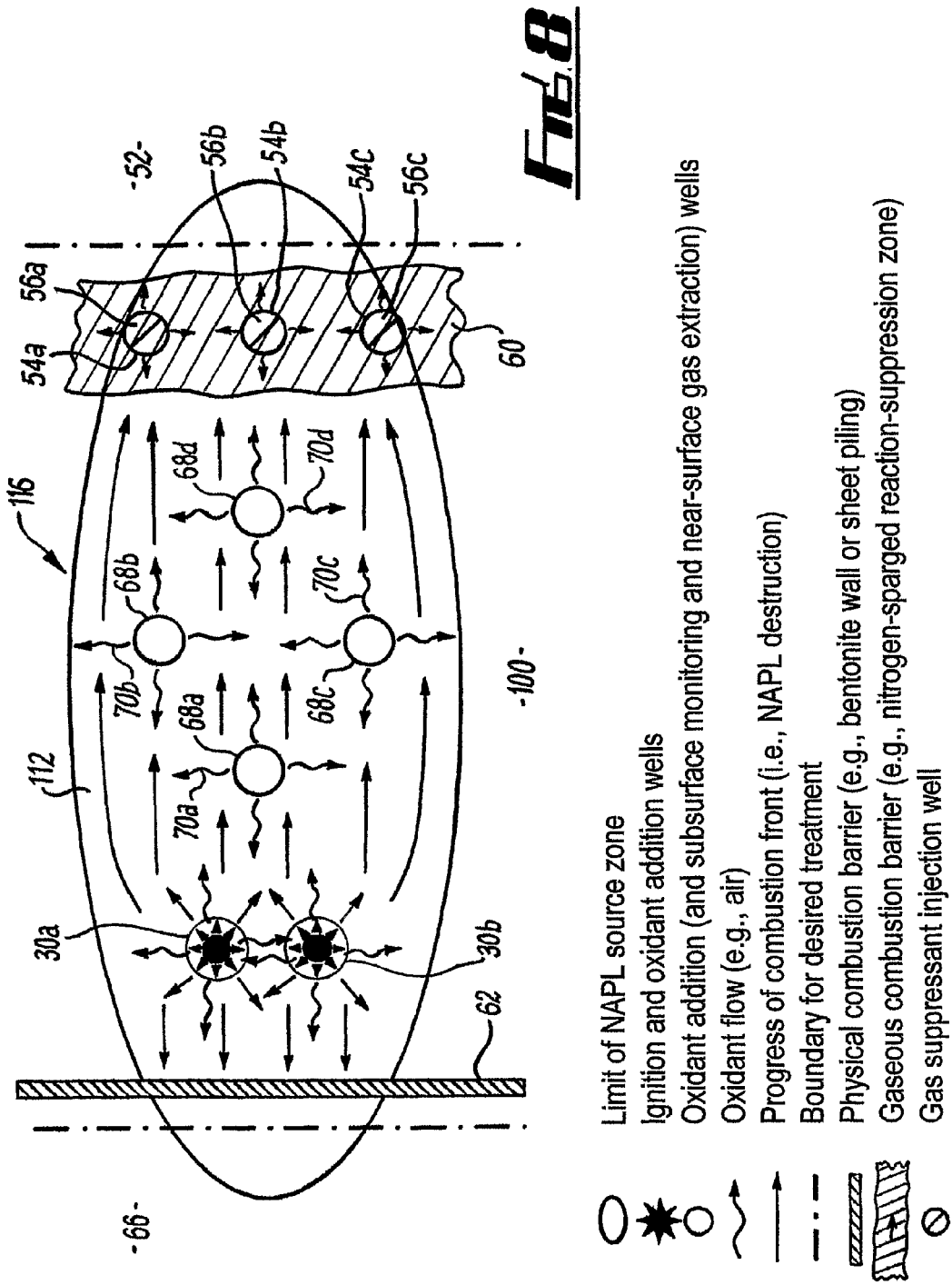
FIG. 8 is a view of the area of land contaminated with a combustible fluid shown in FIG. 5, shown in a still further variation on the method of FIG. 5.

FIG. 8 illustrates in schematic plan view the area of land 100 shown in FIG. 5. In this case, it is desired to restrict passage of the combustion front into the area 52 and also into an area 66 of the ground. The methods illustrated and described in relation to FIGS. 6 and 7 are employed in combination in the method of FIG. 8, with the most appropriate technique selected based upon factors including the particular properties of the soil in the contaminated area 100.

For example, the land in the area 52 may consist largely of rock formations unsuited to the excavating/piling method described in relation to FIG. 7. Accordingly, the method of FIG. 6 may be followed, with a number of boreholes 54a, 54b and 54c drilled using a drill bit. Combustion suppressing devices in the form of gas supply lines 56a, 56b and 56c (respectively) is installed in each borehole 54 and the suppressant fluid injected through each borehole 54 to form the barrier 60. In contrast, the land in the area 66 may consist largely of soft soil or clay-based formations, and the excavating/piling method of FIG. 7 may then be followed to form the barrier 62.

It will be understood that a number of boreholes 54 may be drilled, spaced around the volume 116, to allow for injection of combustion suppressing fluid during the combustion process, if required. For example, water or nitrogen may be injected during the combustion process in order to maintain smouldering combustion or to suppress the reaction in the event that combustion is being found to speed beyond the desired propagation rates. This may occur when the reaction front approaches the surface. A requirement to inject a combustion suppressant in this fashion may be determined through monitoring of the combustion temperature and the temperature, pressure and/or content of the combustion by-products, as described above.

Also illustrated in FIG. 8 are multiple ignition devices 30a, 30b which are spaced across a width of the volume 116. The devices 30a, 30b are typically activated simultaneously to commence combustion of the LNAPL 112 in the volume 116. Furthermore, a number of oxidant supply boreholes 68a to d are shown, through which an oxidant such as air or oxygen may be injected (as indicated by the arrows 70a to d). It will be understood that oxidant may be injected during the combustion process in order to promote, sustain, and/or accelerate combustion. For example, in the event that there is insufficient oxygen present even for smouldering combustion to occur, and the combustion is in danger of extinguishing, it may be necessary to inject an oxidant. A requirement to inject oxidant in this fashion may, again, be determined through monitoring of the combustion temperature and the temperature, pressure and/or content of the combustion by-products, as described above.

It will be understood that combustion of the LNAPL 112 may progress from a single ignition point within the volume 116, using one of the devices 30$a,b$. However, if during progression of the combustion front through the volume 116, monitoring of the combustion process indicates a requirement to ignite the LNAPL 112 at a further location, the other one of the devices 30$a,b$ or even a further device (not shown) may be activated.

It will be understood that combustion of the LNAPL 112 may be thermally self-sufficient in that the or each ignition device 30$a,b$ may be turned off; and may be oxygen sufficient such that no oxidant is required to be supplied through the suppression devices 56. Thus combustion may be self-sustained in that it may be thermally self-sufficient, and/or self-sustained in that it may have sufficient oxygen and thus is not oxygen deficient. Monitoring combustion as described above permits appropriate action to be taken (such as shutting off ignition devices or flow ox oxidant) once combustion is self-sufficient. In the event that it is determined that combustion is not thermally sufficient, one or more of the ignition device 30$a,b$ may be maintained in an activated state.

In general terms, in each of the above described embodiments, it is desired to promote/maintain smouldering combustion, and appropriate remedial action may be taken to promote or maintain such combustion.

There follows a description of preliminary experiments carried out to verify the validity of the methods and apparatus of the invention described above.

Equipment and Methods for Preliminary Experiments:
Equipment:
Experimental cell: Quartz glass beaker (2 sizes, H. Baumbach & Co., Ltd., Ipswich, UK)
1) OD=103 mm, H=175 mm (opaque)
2) OD=106 mm, H=195 mm (clear)
Air diffuser: 8 mm coiled copper tube perforated with 2 mm holes
Igniter: 240V, 450 W Inconel®-coated cable heater, 3.25 mm square cross section×762 mm length (0.128" square cross section×30" long) (Watlow Ltd, Linby, UK, part #125PS30A48A)
Gas analysis: CO and $CO_2$ analyser units (ADC Gas Analysis Ltd, Hoddesdon, UK)
Thermocouples: 1.5 mm and 3 mm×0.5 m Inconel® sheath type K thermocouples (RS Components Ltd., Corby, UK, #219-4488 (3 mm) and #159-095 (1.5 mm))
Data acquisition and recording: Multifunction Switch/Measure Unit (Agilent Technologies, Santa Clara, Calif., USA, #34980A)
Insulation blanket: 240V, 1045 W heating tape 2.54 cm×254 cm, 1.33 W/cm$^2$ (Omega Engineering Ltd., Manchester, UK)
Porous Media (Soil) types:
a) Coarse quartz sand (Leighton Buzzard 8/16 sand, WBB Minerals, Sandbach, UK)
b) Fine quartz sand (Lochaline L60A silica sand, Tarmac Central Ltd., Buxton, UK)
c) Peat (field sample)
d) Oil sands (field sample; fine sand naturally coated with solidified petroleum)
Injected oxidant:
Ambient air, flow rate from zero L/min to approximately 20 L/min Contaminants:
a) Freshly manufactured coal tar (Alfa Aesar, Heysham, UK, item #42488; a viscous, multi-component DNAPL)
b) Vegetable oil (Sainsbury's Supermarkets Ltd, London, UK; a representative, non-toxic representative viscous LNAPL)
c) Dodecane (Fisher Scientific UK Ltd, Loughborough, UK, item #36577-0010; a low viscosity LNAPL)
d) Trichloroethylene (TCE) (Fisher Scientific UK Ltd, Loughborough, UK, item #15831-0010; a chlorinated solvent DNAPL)
e) 1,2-dichloroethane (DCA) (Fisher Scientific UK Ltd, Loughborough, UK, item #D/1756/15; a chlorinated ethane DNAPL)
f) Grease (Electrolube multipurpose MPG50T grease; a viscous, multi-component LNAPL)
g) Field sample of coal tar (recently recovered from a UK site upon which a manufactured gas plant operated in the early 1900s; DNAPL)
h) Solid explosive compound (particulate ammonium nitrate—the primary component of TNT or DNT—mixed with inert components; solid compound that incorporates oxidant)
i) Petroleum (naturally occurring solidified coating on oil sands, obtained as part of field sample core).

Note: In the field, chlorinated solvents are typically not found as pure (i.e., lab grade) chemicals but mixed with up to 30% oil and grease (Dwarakanath, V., R. E. Jackson, and G. A. Pope, 2002. Influence of Wettability on the Recovery of NAPLs from Alluvium. Environmental Science and Technology, 36 (2), 227-231). Thus, the experiments with solvents employed multi-component mixtures (see Results): 75% TCE+25% Oil (by weight), 75% Dodecane+25% Oil (by weight), 75% DCA+25% Grease (by weight).

Experimental Procedure:
FIG. 9 presents a schematic illustration of the experiment. Preliminary experiments to examine the basic concepts of in situ combustion for remediation of contaminated porous media was carried out in an approximately 1 L quartz glass beaker 72 (103 mm OD×175 mm H or 106 mm OD×195 mm H, H. Baumbach & Co., Ltd.). The beaker was filled with a small amount of coarse sand (Leighton Buzzard 8/16 sand, WBB Minerals) sufficient to place the air diffuser 74 above the bottom of the beaker by several millimeters. The air diffuser 74 consisted of a length of 8 mm copper tubing, bent into a coil and perforated with 1.5-2 mm holes along the bottom portion of the tube so that air flow would be directed upward. The chosen porous media was used to bury the air diffuser by several millimeters. The ignition element 76, a coiled 3.25 mm square cross section×762 mm length Inconel®-coated cable heater (240V, 450W, part #125PS30A48A, Watlow Ltd), was placed above the air diffuser 74. The chosen porous media 75 was then added to the beaker to bury the ignition element by 5 centimeters. If the contaminant was a solid, it was mixed with the sand that was emplaced in this step. If the contaminant was a liquid, then it was added subsequently and allowed to percolate downward through the media, typically immersing the cable heater 76. Thus, the emplaced contaminant zone was typically 5 cm height above the ignition element 76. The chosen porous media was then filled to within 5 cm of the top of the apparatus. Three centimeters of fine sand (Lochaline L60A silica sand, Tarmac Central Ltd.) were placed at the top of the emplaced porous media to serve as a cap. Up to five 1.5 mm or 3 mm×0.5 m Inconel® sheath Type K thermocouples 78$a$ to $e$ (parts #219-4488 (3 mm) and #159-095 (1.5 mm), RS Components Ltd.) were inserted into the porous media with their measuring tips exposed at locations of 1 cm intervals above the cable heater 76, with the last thermocouple 78e typically placed outside of the contaminated zone. The thermocouples 78a to e were connected to a Multifunction Switch/Measure Unit (34980A, Agilent Technologies), which logged the data, converted the voltage output to temperature, and passed the results onto a computer.

The small diameter of the apparatus used in these preliminary experiments means that the system is prone to excessive heat loss (which are not expected in larger experiments or in situ applications). To reduce heat losses, the glass beaker 72 was wrapped in heating tape (240V, 1045 W, 1.33 W/cm$^2$, Omega Engineering, Ltd.). The heating tape was used turned on first, bringing the system to an elevated (but insufficient for combustion, i.e. approximately 200° C.) starting temperature in order to counter heat loss to the surrounding air. Once that temperature was achieved, the cable heater ignition element 76 was turned activated with a current of 1.7 Amperes. Shortly afterwards, air flow was initiated, supplied at a flow rate of 20 L/min. Once airflow began, the igniter 76 was allowed to remain on until after the temperature reading from the thermocouple 78a closest to the igniter 76 peaked and began to decrease. CO and $CO_2$ gas measurements (ADC Gas Analysis Ltd.) were made of the gas stream exiting the top of the porous media 75, as these are byproducts of combustion. After the ignition element was turned off, air injection was continued, as was temperature, CO and $CO_2$ recording continued until insignificant CO or $CO_2$ was present in the off-gases and the reaction temperature dropped to levels not likely to support a combustion reaction. After the system had cooled, the porous media 75 was carefully excavated. Photographs were taken to demark the extent of remediation and the degree of remaining contamination was visually evaluated. In some cases, samples were analysed for residual contaminants by gas chromatography; the method follows.

Gas Chromatography-Mass Spectrometer (GC/MS) was used for the trichloroethylene (TCE) and 1,2-dichlorethane (DCA) experiments. Approximately 10 grams of each soil was placed in a 20 mL headspace vial and crimp sealed with a PTFE/silicon septum. The GC/MS method was optimised to identify low levels of DCA and trichloroethylene TCE. Detection limit for TCE and DCA is approximately 0.5 ppm.

Gas Chromatography-Flame Ionization Detector (GC/FID) was employed for the experiments involving dodecane, vegetable oil and coal tar. Approximately 10 g of each sand were placed in a 20 mL glass vial. Dichloromethane was added to a level approximately 1 cm above the sand. The vials were crimp sealed with PTFE/silicon septa, shaken and placed in a 50° C. incubator for 12 hours. The vials were then shaken, sand allowed to settle, and extract removed and transferred to 2 mL autosampler vials for analysis. Masses were recorded before and after incubation to ensure limited losses during heating. Detection limit for compounds by this method is approximately 0.5 ppm.

Results:

Over 30 experiments have been conducted, examining different ignition sources, experimental setups, equipment devices, fuel types, sand types, etc. A number of those are not presented as they helped to refine the final ignition and experimental processes (outlined in experimental procedure above). This section describes in detail one experiment, that of coal tar combustion in coarse quartz sand, as a representative set of experimental results that followed the described experimental procedure. The results of other experiments using the described procedure are summarised in tabular form in FIG. 10.

Coal Tar Within Coarse Sand Experiment:

FIG. 11 presents the results for the liquid contaminant coal tar within coarse quartz sand, with the graph lines 80a to e representative of the measured temperature vs. time at the corresponding thermocouples 78a to e. FIG. 11 also illustrates the percentage (by volume) of CO and $CO_2$ in the combustion products.

The initial temperature rise is associated with the heating tape. In experiments conducted without the tape, a similar temperature rise is observed as a result of the ignition element but the heat is less equally distributed, dominated instead at the lowest thermocouple 78a, which is next to the igniter. The scale of the test apparatus results in increased heat losses, which need to be compensated by a low temperature heating tape (i.e. approximately 200° C.). It is noted that the heating tape is required only due to the small size of this 'proof of concept' experimental apparatus; in a full scale experimental apparatus, as in the field, the porous media volume is large enough to act as the insulator and therefore heat losses of this type will not occur and such additional heat application will not be required. This is consistent with a theoretical analysis that scales the results to larger systems and with extensive experimental experience in the smouldering combustion of solid porous foam (e.g., cushions) at a variety of scales.

FIG. 11 demonstrates that when the ignition element 76 is turned on, the temperature increases rapidly in its immediate vicinity. The temperature increase again accelerates when the air (oxidant) flow is begun. FIG. 11 demonstrates that in situ combustion initiates relatively quickly after this time, as evidenced by the appearance of CO and $CO_2$, which are gaseous combustion products. Their appearance is taken to coincide with the ignition temperature and ignition time, observed to be 400° C. and 57 min in this experiment, respectively. In situ temperatures typically rise quickly following the onset of combustion, with the maximum temperature taken as the maximum peak achieved in any thermocouple 78 (in this case, the second thermocouple 78b from the ignition element 76).

In this experiment, the ignition element was turned off 10 minutes after combustion began while the oxidant delivery is maintained. After this time, FIG. 11 illustrates that self-sustaining combustion is observed in this experiment, meaning that the combustion front is propagating through the contaminated zone without the addition of external energy. Evidence for this includes the succession of temperature peaks at successive locations further from the ignition point (e.g., the sustained maximum temperature between thermocouples 78a and 78b (TC1 and TC2) and the sustained maximum temperature between thermocouples 78c and 78d (TC3 and TC4), as indicated by the graph lines 80a to d. Further evidence is the successive 'cross-over of temperature profile plots (e.g., the temperature at TC4 is still increasing while that at TC3 is decreasing; note that TC5 is not within the contaminant zone). Heat is transferred from high temperature to low temperature, thus a cross over indicates that heat is being transferred from Thermocouple 78d (TC4) to Thermocouple 78c (TC3) evidencing that significant heat generation is occurring at the location of Thermocouple 78d (TC4). The continued production of combustion gasses (CO and $CO_2$) provide further evidence that combustion continued after the ignition element 76 was turned off. The velocity of the propagating combustion front is measured by dividing the spatial distance between thermocouples 78 by the time between maximum temperature peaks; in this case the velocity is estimated at $4.1 \times 10^{-5}$ m/s. Literature values with different fuels indicate that these are typical smouldering combustion propagation velocities. The final decrease in temperature at each location follows a similar profile, representative of energy dissipation after all of the contaminant has been destroyed and the reaction has locally self-extinguished.

By way of comparison, the base case experiment was repeated exactly but with no fuel/contaminant in the porous media. The thermocouple 78d (TC 4—sand only) temperature profile 80f is directly comparable with TC 4 from the coal tar experiment. The area under a temperature history is proportional to the energy released during the process, therefore the difference between the two represents the energy produced by the combustion of the contaminant. Estimation of the areas under each curve demonstrates that the energy produced by the combustion process in the immediacy of Thermocouple 4 is more than four times greater than the energy delivered by the ignition system at this location. This provides clear evidence that once ignition has been achieved, the energy required for self-sustained propagation can be delivered by the combustion of the contaminant with no further need for subsequent ignition devices. All excess energy will be delivered forwards and thus used to accelerate the reaction front.

Photographs of the contaminant and porous material were taken both before and after the experiment, which revealed the thoroughness of remediation in the combustion zone: no observable contaminant remained. Physical handling of the remediated soil and comparing bulk density measurements before and afterwards also confirmed no contamination remaining. The photos also showed that the coal tar located beneath the igniter 76 (and thus out of the combustion zone) does not get remediated despite being substantially heated; instead the coal tar and sand become partially solidified upon cooling. It was also observed that remediation by in situ combustion changes the soil colour to red, which is the result of high temperature iron oxidation and is typically observed in soil affected by forest fires where the temperature exceeded 600° C.

Gas Chromatography (GC) analysis was utilised to assess the extent to which compounds remained in the soil excavated from the combustion zone. As denoted in the final column of FIG. 10, only a trace level of residual compounds were detected, with a signal close to the detection limit of the method and insufficient for quantification.

FIG. 10 presents summary results from 13 other experiments conducted with the same method as described for the coal tar/coarse sand experiment presented. FIG. 10 illustrates that in situ combustion was successfully achieved in all of the experiments. This includes 3 additional common NAPLs and two solid materials. The Figure also indicates successful in situ smouldering combustion for a variety of porous media types, for a variety of fluid saturations (both water and NAPL), for field-derived samples as well as laboratory samples, and heterogeneous conditions in the source zone (i.e., combustion zone). In only two experiments was there any contaminant observed to remain in the combustion zone; in these cases channeling of the oxidant clearly caused the oxidant to bypass one location which did not achieve combustion. GC analysis confirmed the virtual elimination of all organic compounds from the combustion zone in the 8 experiments subjected to analysis. The combustion propagation velocities in FIG. 10 are typical of smouldering combustion being the dominant combustion regime in these experiments.

Two repeat base case (i.e., coal tar in coarse sand) experiments were conducted and very similar results to those described in FIG. 10 were obtained, indicating the reproducibility of the method. A third repeat was conducted but in this case the air flow was terminated at approximately 5 minutes after the ignition element was turned off; in other words, after self-sustaining combustion had been established but before all of the contaminant had been combusted. This experiment demonstrated that combustion ceased in this case very soon after the oxidant input was terminated. This demonstrates that the reaction can be extinguished in by removing the oxidant injection stream. Moreover, upon cooling, the resulting sand-pack was found to not be completely remediated, instead containing a substantial solidified mass of heated coal tar and sand. This mass could not be removed from the experimental apparatus; therefore, at this time, the ignition process was applied to the cooled mass and in situ combustion was successfully restarted. At the end of this second combustion phase for this experiment, the sand was easily excavated and no observable coal tar remained in the combustion zone. This indicates that the process can be stopped and successfully restarted and underscores that heating without combustion does not achieve remediation, at least for the case tested.

The above experimental date clearly demonstrates that the method and apparatus of the present invention is viable for remediating land contaminated with combustible materials such as DNAPLS and LNAPLS in situ.

Existing thermal methods are promising for in-situ NAPL remediation but are prohibitively costly. In the present invention, propagation of a combustion front through a porous medium can be achieved for very low fuel content if the reaction propagates in the forward mode (FIG. 3). Research has shown that this can be applied to hydrocarbon liquids embedded in the subsurface and that the process can be modulated to propagate in an optimal manner. Energy input may be limited to initial ignition of the NAPL 12 near the base of the source zone 16, after which a self-sustaining reaction may proceed. The technique exhibits the advantages of existing thermal technologies (including effective mass reduction and indifference to permeability contrasts), and will be much more cost-effective since continuous energy input is not typically required (i.e., self-sustaining). Moreover, the combustion front will naturally follow the connected-phase NAPL 12 (i.e., fuel) pathway through the pore spaces 36, even if those are not known/determined in advance. The method and thus the combustion process may therefore be effectively self-guiding. Thus, significant advantages over existing chemical, physical and biological technologies are provided, which often: inefficiently target a much greater subsurface volume than the NAPL 12 itself; rely on expensive chemical additions that tend to bypass contaminant zones and become diluted below effective levels; and are ineffective around low permeability regions upon which the NAPLs 12 tend to accumulate.

Various modifications may be made to the foregoing without departing from the spirit and scope of the present invention.

The invention claimed is:

1. A method of remediating land contaminated with a combustible material, the method comprising the steps of:
   locating a subterranean volume of combustible material in land to be remediated, wherein the land defines a porous matrix and the combustible material is present in the porous matrix,
   igniting the combustible material to combust the combustible material in a smouldering combustion process by applying heat to the combustible material with an ignition device followed by supplying an oxidant to the combustible material; and
   when the smouldering combustion process is established, deactivating the ignition device and thereby remediating the land.

2. A method according to claim 1, in which the method comprises controlling at least one of: an extent of heating of the combustible material; a rate of supplying an oxidant to the combustible material; and a rate of supplying a combustion suppressant to the combustible material, to provide the smouldering combustion process.

3. A method according to claim 2, in which the method further comprises monitoring combustion of the combustible material and performing the controlling step in dependence on the monitoring of the combustion.

4. A method according to claim 3, in which the controlling step is performed to at least one of: establish smouldering combustion; and maintain smouldering combustion.

5. A method according to claim 1, in which smouldering combustion of the combustible material is maintained in the presence of one of the group consisting of: the combustible material and an oxidant supplied to the combustible material; and a combustion suppressant supplied to the combustible material.

6. A method according to claim 1, in which the land defining the porous matrix consists of at least one of: particulate matter; and a fractured rock environment.

7. A method according to claim 1, in which the method further comprises monitoring the combustible material for smouldering combustion and deactivating the ignition device when smouldering combustion is present.

8. A method according to claim 1 comprising combusting the material in situ.

9. A method according to claim 1, in which following ignition of the combustible material a combustion front is generated which progresses away from at least one point of ignition and through the combustible material.

10. A method according to claim 1 comprising igniting the combustion material at a plurality of locations within the material volume.

11. A method according to claim 1, comprising extinguishing combustion after a desired time period.

12. A method as claimed in claim 11, comprising extinguishing combustion at a desired location by creating one or more combustion barriers.

13. A method according to claim 1, comprising combusting the combustible material in a self-sustaining smouldering combustion process.

14. A method according to claim 1, comprising igniting the material using an ignition device; monitoring combustion and, where the combustion is oxygen starved, supplying an oxidant to maintain combustion; and selectively changing the supply of oxidant to control a propagation rate of combustion.

15. A method according to claim 1, comprising igniting the material using an ignition device; monitoring combustion and, where the combustion is oxygen starved, supplying an oxidant to maintain combustion; and selectively changing the supply of oxidant to extinguish combustion.

16. A method according to claim 1, comprising igniting the material using an ignition device; monitoring combustion and, where the combustion is not oxygen starved, selectively injecting a combustion suppressant to control a propagation rate of combustion.

17. A method according to claim 1, comprising igniting the material using an ignition device; monitoring combustion and, where the combustion is not oxygen starved, selectively injecting a combustion suppressant to extinguish combustion.

18. A method according to claim 1 further comprising injecting, using at least one fluid injection device, an oxidant into the combustible material to modify the rate, degree or extent of the smouldering combustion process.

* * * * *